(12) United States Patent
Smits

(10) Patent No.: US 10,935,989 B2
(45) Date of Patent: Mar. 2, 2021

(54) METHODS AND SYSTEMS FOR NAVIGATING A VEHICLE INCLUDING A NOVEL FIDUCIAL MARKER SYSTEM

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 16/820,523

(22) Filed: Mar. 16, 2020

(65) Prior Publication Data

US 2020/0225357 A1 Jul. 16, 2020

Related U.S. Application Data

(63) Continuation of application No. 16/165,631, filed on Oct. 19, 2018, now Pat. No. 10,591,605.

(Continued)

(51) Int. Cl.
*G08G 1/16* (2006.01)
*G01C 21/36* (2006.01)
(Continued)

(52) U.S. Cl.
CPC ......... *G05D 1/106* (2019.05); *G01C 21/3461* (2013.01); *G01C 21/3626* (2013.01); *G01S 17/04* (2020.01); *G01S 17/931* (2020.01); *G05D 1/0236* (2013.01); *B60G 17/00* (2013.01); *B60G 17/019* (2013.01); *B60G 17/0165* (2013.01); *B60G 2400/60* (2013.01); *B60G 2400/821* (2013.01); *B60G 2400/84* (2013.01); *B60G 2400/841* (2013.01); *B60G 2400/842* (2013.01); *B60G 2400/843* (2013.01); *B60G 2401/142* (2013.01); *B60G 2401/16* (2013.01);
(Continued)

(58) Field of Classification Search
None
See application file for complete search history.

(56) References Cited

U.S. PATENT DOCUMENTS

| 4,019,262 A | 4/1977 | Breglia et al. |
| 4,340,274 A | 7/1982 | Spooner |

(Continued)

FOREIGN PATENT DOCUMENTS

| CN | 102576156 A | 7/2012 |
| DE | 102015205826 A1 | 10/2015 |

(Continued)

OTHER PUBLICATIONS

Savage, P., "GDC 2013: Valv's Michael Abrash on the challenges of VR—'a new world is emerging'," PCGamer; Apr. 2, 2013, pp. 1-6.
(Continued)

*Primary Examiner* — Adam D Tissot
(74) *Attorney, Agent, or Firm* — John W. Branch; Branch Partners PLLC

(57) ABSTRACT

Methods and systems for navigating a vehicle along a surface employ a scanner to scan a light beam over the surface; employ light reflected by one or more fiducial markers on the surface onto pixels of a receiver to determine a spatial arrangement of the fiducial markers on the surface; and compare the spatial arrangement of the fiducial markers with a predetermined map of the fiducial markers to determine a location of the vehicle.

20 Claims, 20 Drawing Sheets

Related U.S. Application Data

(60) Provisional application No. 62/707,194, filed on Oct. 19, 2017.

(51) Int. Cl.
  | | |
  |---|---|
  | *G05D 1/02* | (2020.01) |
  | *G05D 1/10* | (2006.01) |
  | *G01C 21/34* | (2006.01) |
  | *G01S 17/931* | (2020.01) |
  | *G01S 17/04* | (2020.01) |
  | *B60G 17/00* | (2006.01) |
  | *B60G 17/019* | (2006.01) |
  | *B60G 17/0165* | (2006.01) |

(52) U.S. Cl.
  CPC .... *B60G 2401/174* (2013.01); *B60G 2500/30* (2013.01); *G05D 1/0231* (2013.01); *G05D 1/101* (2013.01); *G05D 2201/0213* (2013.01)

(56) References Cited

U.S. PATENT DOCUMENTS

| | | |
|---|---|---|
| 4,820,041 A | 4/1989 | Davidson et al. |
| 4,988,187 A | 1/1991 | Kuriyama |
| 5,052,820 A | 10/1991 | McGinniss et al. |
| 5,107,122 A | 4/1992 | Barkan et al. |
| 5,115,230 A | 5/1992 | Smoot |
| 5,218,427 A | 6/1993 | Koch |
| 5,245,398 A | 9/1993 | Ludden |
| 5,455,588 A | 10/1995 | Lew et al. |
| 5,506,682 A | 4/1996 | Pryor |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,793,491 A | 8/1998 | Wangier et al. |
| 5,812,664 A | 9/1998 | Bernobich et al. |
| 5,914,783 A | 6/1999 | Barrus |
| 5,930,378 A | 7/1999 | Kubota et al. |
| 6,115,022 A | 9/2000 | Mayer, III et al. |
| 6,130,706 A | 10/2000 | Hart, Jr. et al. |
| 6,195,446 B1 | 2/2001 | Skoog |
| 6,307,526 B1 | 10/2001 | Mann |
| 6,404,416 B1 | 6/2002 | Kahn et al. |
| 6,535,182 B2 | 3/2003 | Stanton |
| 6,535,275 B2 | 3/2003 | McCaffrey et al. |
| 6,543,899 B2 | 4/2003 | Covannon et al. |
| 6,545,670 B1 | 4/2003 | Pryor |
| 6,670,603 B2 | 12/2003 | Shimada et al. |
| 6,692,994 B2 | 2/2004 | Davis et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,843,564 B2 | 1/2005 | Putilin et al. |
| 6,843,568 B2 | 1/2005 | Schenk et al. |
| 6,894,823 B2 | 5/2005 | Taylor et al. |
| 6,982,683 B2 | 1/2006 | Stanton |
| 7,006,142 B2 | 2/2006 | Seo |
| 7,023,536 B2 | 4/2006 | Zhang et al. |
| 7,027,222 B2 | 4/2006 | Takahashi et al. |
| 7,116,455 B2 | 10/2006 | Yarnoaka |
| 7,119,965 B1 | 10/2006 | Rolland et al. |
| 7,144,117 B2 | 12/2006 | Kojima |
| 7,182,465 B2 | 2/2007 | Fuchs et al. |
| 7,203,383 B2 | 4/2007 | Fisher |
| 7,232,229 B2 | 6/2007 | Peeters et al. |
| 7,262,765 B2 | 8/2007 | Brown et al. |
| 7,278,745 B2 | 10/2007 | Engle |
| 7,280,211 B2 | 10/2007 | Horibe et al. |
| 7,283,301 B2 | 10/2007 | Peeters et al. |
| 7,289,110 B2 | 10/2007 | Hansson |
| 7,303,289 B2 | 12/2007 | Fujiwara |
| 7,348,528 B2 | 3/2008 | Marshall |
| 7,349,553 B2 | 3/2008 | Rodriguez |
| 7,359,041 B2 | 4/2008 | Xie et al. |
| 7,375,804 B2 | 5/2008 | Liebman et al. |
| 7,377,656 B2 | 5/2008 | Nojima et al. |
| 7,440,691 B2 | 10/2008 | Beniyama et al. |
| 7,511,847 B2 | 3/2009 | Siiverbrook et al. |
| 7,554,652 B1 | 7/2009 | Babin et al. |
| 7,667,598 B2 | 2/2010 | Yenisch et al. |
| 7,787,134 B2 | 8/2010 | Kohnen et al. |
| 7,905,567 B2 | 3/2011 | Orsley |
| 7,911,444 B2 | 3/2011 | Yee |
| 8,115,728 B2 | 2/2012 | Feng |
| 8,123,928 B2 | 2/2012 | Cayouette et al. |
| 8,169,447 B2 | 5/2012 | Bhogal et al. |
| 8,170,329 B2 | 5/2012 | Seko et al. |
| 8,189,176 B2 | 5/2012 | Moir |
| 8,213,022 B1 | 7/2012 | Riza et al. |
| 8,259,239 B2 | 9/2012 | Hua |
| 8,282,222 B2 | 10/2012 | Smits |
| 8,297,758 B2 | 10/2012 | Choi et al. |
| 8,330,942 B2 | 12/2012 | Nordenfelt et al. |
| 8,355,117 B2 | 1/2013 | Niclass |
| 8,430,512 B2 | 4/2013 | Smits |
| 8,493,573 B2 | 7/2013 | Chinn et al. |
| 8,558,810 B2 | 10/2013 | Guo |
| 8,573,783 B2 | 11/2013 | Smits |
| 8,665,435 B2 | 3/2014 | Hidaka |
| 8,696,141 B2 | 4/2014 | Smits |
| 8,711,370 B1 | 4/2014 | Smits |
| 8,718,326 B2 | 5/2014 | Yoon et al. |
| 8,773,512 B1 | 7/2014 | Rafii |
| 8,780,161 B2 | 7/2014 | Sarnadani et al. |
| 8,797,531 B2 | 8/2014 | Knox et al. |
| 8,941,817 B2 | 1/2015 | Laudrain et al. |
| 8,947,755 B2 | 2/2015 | Konuma et al. |
| 8,953,242 B2 | 2/2015 | Larson et al. |
| 8,957,847 B1 | 2/2015 | Karakotsios et al. |
| 8,994,780 B2 | 3/2015 | Moore |
| 9,026,596 B2 | 5/2015 | Perez et al. |
| 9,080,866 B1 | 7/2015 | Dowdall et al. |
| 9,131,192 B2 | 9/2015 | Ubillos et al. |
| 9,134,799 B2 | 9/2015 | Mark |
| 9,151,607 B2 | 10/2015 | Davies et al. |
| 9,244,339 B2 | 1/2016 | Wang |
| 9,323,055 B2 | 4/2016 | Baillot |
| 9,366,519 B2 | 6/2016 | Danbury et al. |
| 9,377,533 B2 | 6/2016 | Smits |
| 9,392,225 B2 | 7/2016 | Eisenberg |
| 9,454,014 B2 | 9/2016 | Kurashige et al. |
| 9,562,764 B2 | 2/2017 | France |
| 9,599,713 B2 | 3/2017 | Giger et al. |
| 9,618,610 B2 | 4/2017 | Kao et al. |
| 9,703,473 B2 | 7/2017 | Schillings et al. |
| 9,813,673 B2 | 11/2017 | Smits |
| 9,654,196 B2 | 12/2017 | Liu et al. |
| 9,842,514 B2 | 12/2017 | Hoelzer et al. |
| 9,864,440 B2 | 1/2018 | Geller et al. |
| 9,939,233 B2 | 4/2018 | Scott et al. |
| 9,946,076 B2 | 4/2018 | Smits et al. |
| 9,952,033 B2 | 4/2018 | Martini et al. |
| 9,961,337 B2 | 5/2018 | Stroetrnann |
| 10,037,017 B2 | 7/2018 | Wooldridge et al. |
| 10,067,230 B2 | 9/2018 | Smits |
| 10,331,021 B2 | 6/2019 | Smits |
| 2001/0043165 A1 | 11/2001 | Stanton |
| 2002/0011987 A1 | 1/2002 | Kitazawa |
| 2002/0036765 A1 | 3/2002 | McCaffrey et al. |
| 2002/0039138 A1 | 4/2002 | Edelson et al. |
| 2002/0040971 A1 | 4/2002 | Ono |
| 2002/0067466 A1 | 6/2002 | Covannon et al. |
| 2002/0089489 A1 | 7/2002 | Carpenter |
| 2002/0100884 A1 | 8/2002 | Maddock |
| 2002/0139920 A1 | 10/2002 | Seibel et al. |
| 2002/0145588 A1 | 10/2002 | McCahon et al. |
| 2002/0149694 A1 | 10/2002 | Seo |
| 2003/0010888 A1 | 1/2003 | Shirnada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |

(56) References Cited

U.S. PATENT DOCUMENTS

| | | |
|---|---|---|
| 2003/0214710 A1 | 11/2003 | Takahashi et al. |
| 2003/0222649 A1 | 12/2003 | Starkweather |
| 2004/0006424 A1 | 1/2004 | Joyce et al. |
| 2004/0041996 A1 | 3/2004 | Abe |
| 2004/0054359 A1 | 3/2004 | Ruiz et al. |
| 2004/0100508 A1 | 5/2004 | Hansson |
| 2004/0114834 A1 | 6/2004 | Fisher |
| 2004/0218155 A1 | 11/2004 | Schenk et al. |
| 2004/0240754 A1 | 12/2004 | Smith et al. |
| 2004/0263874 A1 | 12/2004 | Silverbrook et al. |
| 2005/0024586 A1 | 2/2005 | Teiwes et al. |
| 2005/0030305 A1 | 2/2005 | Brown et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195375 A1 | 9/2005 | Fujiwara |
| 2005/0195387 A1 | 9/2005 | Zhang et al. |
| 2005/0219530 A1 | 10/2005 | Horibe et al. |
| 2005/0254726 A1 | 11/2005 | Fuchs et al. |
| 2005/0273830 A1 | 12/2005 | Silver et al. |
| 2006/0028328 A1 | 2/2006 | Cresse |
| 2006/0028374 A1 | 2/2006 | Fullerton |
| 2006/0028375 A1 | 2/2006 | Honda et al. |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0103699 A1 | 5/2007 | Kohnen et al. |
| 2007/0138371 A1 | 6/2007 | Marshall |
| 2007/0182949 A1 | 8/2007 | Niclass |
| 2007/0273610 A1 | 11/2007 | Baillot |
| 2008/0018591 A1 | 1/2008 | Pittel et al. |
| 2008/0266169 A1 | 10/2008 | Akita |
| 2008/0291213 A1 | 11/2008 | Bhogal |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0013860 A1 | 1/2010 | Mandella et al. |
| 2010/0014750 A1 | 1/2010 | Seko et al. |
| 2010/0045967 A1 | 2/2010 | Moir |
| 2010/0110385 A1 | 5/2010 | Choi et al. |
| 2010/0142856 A1 | 6/2010 | Takeuchi et al. |
| 2010/0149518 A1 | 6/2010 | Nordenfelt et al. |
| 2010/0328054 A1 | 12/2010 | Yim et al. |
| 2011/0001793 A1 | 1/2011 | Moriyama et al. |
| 2011/0102763 A1 | 5/2011 | Brown et al. |
| 2011/0115747 A1 | 5/2011 | Powell et al. |
| 2011/0123113 A1 | 5/2011 | Berretty et al. |
| 2011/0211243 A1 | 9/2011 | Smits |
| 2011/0249157 A1 | 10/2011 | Fredenbach et al. |
| 2011/0304842 A1 | 12/2011 | Kao et al. |
| 2012/0017147 A1 | 1/2012 | Mark |
| 2012/0050528 A1 | 3/2012 | Davies et al. |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0229618 A1 | 9/2012 | Chinn et al. |
| 2012/0250152 A1 | 10/2012 | Larson et al. |
| 2012/0262696 A1 | 10/2012 | Eisele et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0170006 A1 | 7/2013 | Kurashige et al. |
| 2013/0176561 A1 | 7/2013 | Hidaka |
| 2013/0215487 A1 | 9/2013 | Konuma et al. |
| 2013/0229669 A1 | 9/2013 | Smits |
| 2013/0239057 A1 | 9/2013 | Ubillos et al. |
| 2013/0258108 A1* | 10/2013 | Ono ................. H04N 7/18 348/148 |
| 2013/0293396 A1 | 11/2013 | Selevan |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0204385 A1 | 7/2014 | Ouyang et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0285818 A1 | 9/2014 | Holz |
| 2014/0307248 A1 | 10/2014 | Giger et al. |
| 2014/0350836 A1 | 11/2014 | Stettner et al. |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0160332 A1 | 6/2015 | Sebastian et al. |
| 2015/0169082 A1 | 6/2015 | Li et al. |
| 2015/0225783 A1 | 8/2015 | Mears et al. |
| 2015/0233703 A1 | 8/2015 | Martini et al. |
| 2015/0279114 A1 | 10/2015 | Yonekubo |
| 2015/0285625 A1 | 10/2015 | Deane |
| 2015/0286293 A1 | 10/2015 | Gruhlke et al. |
| 2016/0011312 A1 | 1/2016 | Leyva |
| 2016/0014403 A1 | 1/2016 | Stroetmann |
| 2016/0041266 A1 | 2/2016 | Smits |
| 2016/0047895 A1 | 2/2016 | Dussan |
| 2016/0050345 A1 | 2/2016 | Longbotharn et al. |
| 2016/0139266 A1 | 5/2016 | Montoya et al. |
| 2016/0162747 A1 | 6/2016 | Singh et al. |
| 2016/0259038 A1 | 9/2016 | Retterath et al. |
| 2016/0259058 A1 | 9/2016 | Verheggen et al. |
| 2016/0306044 A1 | 10/2016 | Smits |
| 2016/0335778 A1 | 11/2016 | Smits |
| 2017/0003392 A1 | 1/2017 | Bartlett et al. |
| 2017/0010104 A1 | 1/2017 | Aviel |
| 2017/0045358 A1 | 2/2017 | Masuda et al. |
| 2017/0108443 A1 | 4/2017 | Kurihara et al. |
| 2017/0131090 A1 | 5/2017 | Bronstein et al. |
| 2017/0176596 A1 | 6/2017 | Shpunt et al. |
| 2017/0208292 A1 | 7/2017 | Smits |
| 2017/0299721 A1 | 10/2017 | Eichenholz et al. |
| 2017/0363724 A1 | 12/2017 | Reid |
| 2018/0039852 A1 | 2/2018 | Nakumura et al. |
| 2018/0113216 A1 | 4/2018 | Kremer et al. |
| 2018/0189574 A1 | 7/2018 | Brueckner et al. |
| 2019/0080612 A1* | 3/2019 | Weissman .............. G01S 13/865 |

FOREIGN PATENT DOCUMENTS

| | | |
|---|---|---|
| EP | 0722109 A1 | 7/1996 |
| JP | 11119184 A | 4/1999 |
| JP | 2001045381 A | 2/2001 |
| JP | 2003029201 A | 1/2003 |
| JP | 2004132914 A | 4/2004 |
| JP | 2005519338 A | 6/2005 |
| JP | 2011197674 A | 10/2011 |
| JP | 2013097138 A | 5/2013 |
| KR | 10-2011-0115752 A | 10/2011 |
| KR | 101665938 B1 | 10/2016 |
| WO | 1992/18971 A1 | 10/1992 |
| WO | 2000/034818 A1 | 6/2000 |
| WO | 2002004247 A1 | 1/2002 |
| WO | 2006/063577 A1 | 6/2006 |
| WO | 2008152647 A2 | 12/2008 |
| WO | 2009/049272 A2 | 4/2009 |
| WO | 2011/109402 A2 | 9/2011 |

(56) References Cited

FOREIGN PATENT DOCUMENTS

| WO | 2012/054231 A2 | 4/2012 |
|---|---|---|
| WO | 2014141115 A2 | 9/2014 |
| WO | 2016033036 A2 | 3/2016 |
| WO | 2016168378 A1 | 10/2016 |

OTHER PUBLICATIONS

European Search Report for European Patent Application No. 08837063.0 dated Nov. 19, 2010, pp. 1-8.
Communication Pursuant to Article 94(3) EPC in European Patent Application No. 08837063.0 dated Dec. 27, 2011, pp. 1-5.
Communication Pursuant to Article 94(3) EPC in European Patent Application No. 08837063.0 dated Oct. 22, 2012, pp. 1-6.
International Search Report and Written Opinion in International Patent Application No. PCT/US2008/079663 dated Apr. 30, 2009, pp. 1-5.
International Search Report and Written Opinion in International Patent Application No. PCT/US2011/026691 dated Oct. 24, 2011, pp. 1-7.
International Search Report in International Patent Application No. PCT/US2011/054751 dated Jan. 30, 2012, pp. 1.
International Preliminary Report on Patentability in International Patent Application No. PCT/US2008/079663 dated Jan. 25, 2010, pp. 1-11.
International Preliminary Report on Patentability issued in PCT/US2011/026691 dated Sep. 4, 2012, pp. 1-7.
International Preliminary Report on Patentability issued in PCT/US2011/054751 dated Apr. 9, 2013, pp. 1-7.
Official Communication for U.S. Appl. No. 12/249,899 dated Sep. 14, 2011, pp. 1-11.
Official Communication for U.S. Appl. No. 12/249,899 dated Mar. 13, 2012, pp. 1-12.
Official Communication for U.S. Appl. No. 12/249,899 dated Jun. 6, 2012, pp. 1-12.
Official Communication for U.S. Appl. No. 13/037,949 dated Nov. 2, 2012, pp. 1-12.
Official Communication for U.S. Appl. No. 13/037,949 dated Aug. 26, 2013, pp. 1-9.
Official Communication for U.S. Appl. No. 13/605,948 dated Dec. 31, 2012, pp. 1-10.
Official Communication for U.S. Appl. No. 13/658,762 dated Sep. 13, 2013, pp. 1-16.
Official Communication for U.S. Appl. No. 13/877,652 dated Mar. 12, 2015, pp. 1-20.
Official Communication for U.S. Appl. No. 14/046,374 dated Feb. 20, 2014, pp. 1-10.
European Supplementary Search Report for European Patent Application No. 11634846.1 dated Feb. 21, 2014, pp. 1-7.
Official Communication for U.S. Appl. No. 13/858,762 dated Jan. 31, 2014, pp. 1-15.
Official Communication for U.S. Appl. No. 14/048,954 dated Feb. 26, 2014, pp. 1-24.
Official Communication for U.S. Appl. No. 14/048,954 dated Oct. 22, 2014, pp. 1-8.
International Search Report and Written Opinion for application PCT/US2015/023184 dated Jun. 29, 2015, pp. 1-13.
Official Communication for U.S. Appl. No. 13/877,652 dated Aug. 18, 2015, pp. 1-21.
Official Communication for U.S. Appl. No. 14/636,062 dated Sep. 25, 2015, pp. 1-8.
Official Communication for U.S. Appl. No. 14/671,904 dated Sep. 22, 2015, pp. 1-15.
Official Communication for U.S. Appl. No. 14/636,062 dated Jun. 2, 2015, pp. 1-7.
International Search Report and Written Opinion for PCT/US2015/044691 dated Nov. 18, 2015, pp. 1-12.
Official Communication for U.S. Appl. No. 14/823,668 dated Oct. 30, 2015, pp. 1-12.
Official Communication for U.S. Appl. No. 14/636,062 dated Dec. 14, 2015, pp. 1-3.
Official Communication for U.S. Appl. No. 14/823,668 dated Feb. 24, 2016, pp. 1-15.
Official Communication for U.S. Appl. No. 14/671,904 dated Feb. 22, 2016, pp. 1-13.
Official Communication for U.S. Appl. No. 13/877,652 dated Feb. 10, 2016, pp. 1-22.
Official Communication for U.S. Appl. No. 14/636,062 dated Feb. 1, 2016, pp. 1-9.
O'Toole, M., et al., Homogeneous Codes for Energy-Efficient illumination and Imaging. ACM Transactions on Graphics, 34(4), 35:1-35:13.
Official Communication for U.S. Appl. No. 14/823,668 dated May 18, 2016, pp. 1-10.
Official Communication for U.S. Appl. No. 14/218,643 dated Jun. 23, 2016, pp. 1-11.
Official Communication for U.S. Appl. No. 13/677,652 dated Aug. 12, 2016, pp. 1-22.
Official Communication for U.S. Appl. No. 15/194,502 dated Aug. 19, 2016, pp. 1-12.
Official Communication for U.S. Appl. No. 14/636,062 dated Aug. 24, 2016, pp. 1-9.
International Search Report and Written Opinion for Application PCT/US2016/027386 dated Aug. 26, 2016, pp. 1-10.
Official Communication for U.S. Appl. No. 14/671,904 dated Sep. 28, 2016, pp. 1-14.
Official Communication for U.S. Appl. No. 14/218,643 dated Nov. 1, 2016, pp. 1-10.
Kanzawa, Y., et al., "Human Skin Detection by Visible and Near-Infrared Imaging," (IAPR Conference on Machine Vision Applications, Jun. 13-15, 2011, Nara Japan, pp. 1-5.
Office Communication for U.S. Appl. No. 13/877,652 dated May 31 2017, pp. 1-23.
Office Communication for U.S. Appl. No. 15/194,502 dated Mar. 9, 2017, pp. 1-7.
International Search Report and Written Opinion for International Application No. PCT/US2016/067626 dated Mar. 16, 2017, pp. 1-12.
Office Communication for U.S. Appl. No. 14/671,904 dated May 5, 2017, pp. 1-11.
Office Communication for U.S. Appl. No. 15/411,959 dated May 11, 2017, pp. 1-9.
International Search Report and Written Opinion for International Application No. PCT/US2017/014616 dated May 1, 2017, pp. 1-11.
Official Communication for U.S. Appl. No. 15/384,227 dated Feb. 7, 2017, pp. 1-8.
Official Communication for U.S. Appl. No. 15/384,227 dated Jul. 19, 2017, pp. 1-5.
Official Communication for U.S. Appl. No. 14/671,904 dated Aug. 18, 2017, pp. 1-7.
Official Communication for U.S. Appl. No. 15/194,502 dated Aug. 15, 2017, pp. 1-7.
Official Communication for U.S. Appl. No. 15/411,959 dated Aug. 29, 2017, pp. 1-5.
Official Communication for U.S. Appl. No. 13/877,652 dated Dec. 6, 2017, pp. 1-8.
Official Communication for U.S. Appl. No. 15/799,149 dated Jan. 10, 2018, pp. 1-7.
Official Communication for U.S. Appl. No. 15/444,182 dated Feb. 14, 2018, pp. 1-8.
Official Communication for U.S. Appl. No. 15/194,502 dated Feb. 12, 2018, pp. 1-9.
Official Communication for U.S. Appl. No. 15/804,392 dated Feb. 9, 2018, pp. 1-10.
Official Communication for U.S. Appl. No. 15/804,909 dated Feb. 12, 2018, pp. 1-14.
Official Communication for U.S. Appl. No. 15/098,285 dated Apr. 19, 2018, pp. 1-69.
International Search Report and Written Opinion for International Patent Application No. PCT/US2017/068377 dated Apr. 17, 2018, pp. 1-12.

(56) References Cited

OTHER PUBLICATIONS

Office Communication for U.S. Appl. No. 15/411,959 dated May 11, 2017, pp. 1-8.
Office Communication for U.S. Appl. No. 15/694,532 dated Jul. 10, 2018, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49.
International Search Report and Written Opinion for International Patent Application No. PCT/US2017/059282 dated Aug. 10, 2018, pp. 1-10.
Office Communication for U.S. Appl. No. 15/444,182 dated Sep. 13, 2018, pp. 1-11.
Office Communication for U.S. Appl. No. 16/049,380 dated Sep. 27, 2018, pp. 1-40.
International Search Report and Written Opinion in International Patent Application No. PCT/US18/32078 dated Nov. 16, 2018; pp. 1-16.
Office Communication for U.S. Appl. No. 16/140,485 dated Nov. 23, 2018, pp. 1-58.
Office Communication for U.S. Appl. No. 15/194,502 dated Jan. 3, 2019, pp. 1-15.
Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Office Communication for U.S. Appl. No. 15/444,182 dated Mar. 20, 2019, pp. 1-10.
Office Communication for U.S. Appl. No. 15/194,502 dated Mar. 6, 2019, pp. 1-11.
Office Communication for U.S. Appl. No. 16/223,043 dated Mar. 14, 2019, pp. 1-46.
Office Communication for U.S. Appl. No. 15/976,269 dated Mar. 25, 2019, pp. 1-49.
Office Communication for U.S. Appl. No. 16/114,139 dated Apr. 19, 2019, pp. 1-50.
European Supplementary Search Report for European Patent Application No. 16876940.4 dated May 8, 2019, pp. 1-8.
Office Communication for U.S. Appl. No. 16/140,485 dated Aug. 9, 2019, pp. 1-5.
Office Communication for U.S. Appl. No. 16/114,139 dated Aug. 2, 2019, pp. 1-21.
Office Communication for U.S. Appl. No. 16/140,485 dated Sep. 20, 2019, pp. 1-16.
Office Communication for U.S. Appl. No. 15/976,269 dated Sep. 6, 2019, pp. 1-27.
Office Communication for U.S. Appl. No. 16/443,702 dated Oct. 3, 2019, pp. 1-16.
Office Communication for U.S. Appl. No. 16/398,139 dated Sep. 27, 2019, pp. 1-17.
Office Communication for U.S. Appl. No. 16/530,818 dated Oct. 16, 2019, pp. 1-13.
Office Communication for U.S. Appl. No. 16/114,139 dated Sep. 9, 2019, pp. 1-8.
Office Communication for U.S. Appl. No. 16/398,139 dated Jun. 6, 2019, pp. 1-9.
Office Communication for U.S. Appl. No. 16/140,485 dated Jun. 3, 2019, pp. 1-18.
Office Communication for U.S. Appl. No. 15/976,269 dated Jul. 8, 2019, pp. 1-21.
Office Communication for U.S. Appl. No. 16/384,761 dated Jun. 21, 2019, pp. 1-28.
Office Communication for U.S. Appl. No. 16/261,528 dated May 17, 2019, pp. 1-23.
International Search Report and Written Opinion for Application No. PCT/US18/056757 dated Mar. 11, 2019, pp. 1-12.
Office Communication for U.S. Appl. No. 16/384,761 dated Nov. 29, 2019, pp. 1-6.
Office Communication for U.S. Appl. No. 15/976,269 dated Oct. 8, 2019, pp. 1-3.
Office Communication for U.S. Appl. No. 16/679,110 dated Feb. 13, 2020, pp. 1-10.
Office Communication for U.S. Appl. No. 16/435,392 dated Feb. 21, 2020, pp. 1-10.
Office Communication for U.S. Appl. No. 16/165,631 dated Dec. 27, 2019, pp. 1-7.
Office Communication for U.S. Appl. No. 16/165,631 dated Jul. 19, 2019, pp. 1-11.
Office Communication for U.S. Appl. No. 16/165,631 dated Apr. 1, 2019, pp. 1-10.
Office Communication for U.S. Appl. No. 16/659,513 dated Mar. 20, 2020, pp. 1-12.
Office Communication for Chinese Patent Application No. 201780018948.1 dated Mar. 27, 2020, pp. 1-7.
Office Communication for U.S. Appl. No. 16/530,818 dated Apr. 6, 2020, pp. 1-5.
Office Communication for U.S. Appl. No. 15/953,278 dated Apr. 9, 2020, pp. 1-5.
Extended European Search Report for EP Patent Application No. 17878671.1 dated May 7, 2020, pp. 1-11.
Extended European Search Report for EP Patent Application No. 17742125.2 dated Jul. 29, 2019, pp. 1-13.
Li et al., "Facial Performance Sensing Head-Mounted Display." ACM Transactions on Graphics (TOG), vol. 34, No. 4, 2015, pp. 1-9.
Seymour, "Facing Second Son—fxguide," Feb. 2, 2015, https://www.fxguide.com/fxfeatured/facing-second-son/, retrieved on Jul. 19, 2019, pp. 1-18.
Rolland et al., "Development of Head-Mounted Projection Displays for Distributed, Collaborative, Augmented Reality Applications." Presence: Teleoperators & Virtual Environments, vol. 14, No. 5, 2005, pp. 528-549.
International Search Report and Written Opinion for International Patent Application No. PCT/US2019/015739 dated May 17, 2019, pp. 1-7.

\* cited by examiner

METHODS AND SYSTEMS FOR NAVIGATING A VEHICLE INCLUDING A NOVEL FIDUCIAL MARKER SYSTEM

CROSS-REFERENCE TO RELATED APPLICATIONS

This Utility Patent Application is a Continuation of U.S. patent application Ser. No. 16/165,631 filed on Oct. 19, 2018, now U.S. Pat. No. 10,591,605 issued on Mar. 17, 2020, which is based on previously filed U.S. Provisional Patent Application U.S. Ser. No. 62/707,194, filed on Oct. 19, 2017, the benefit of the filing dates of which are hereby claimed under 35 U.S.C. § 119(e) and § 120 and the contents of which are each further incorporated in entirety by reference.

TECHNICAL FIELD

The present invention relates generally to a navigation or imaging system and to methods of making and using the navigation or imaging system. The present invention is also directed a navigation system that uses fiducial markers in a surface to identify a location of the vehicle.

BACKGROUND

The objective of a high-fidelity 3D motion capture system is to accurately observe and track objects and structures in the real world. Our world is a three-dimensional space where all observable structures, objects and shapes have spatial geometries. To fully describe these geometries actually takes 6 dimensions, or 6 degrees of freedom (DoF). For example, a small projectile may be tracked at a position in space in three Cartesian coordinates (x, y, & z). To describe the projectile's orientation at that position requires three additional dimensions, often described in navigational terms as rotational dimensions, such as roll, pitch and yaw. (In unmanned aerial vehicles (UAVs) these rotations around the longitudinal, horizontal and vertical axis respectively are the key control and stability parameters determining the flight dynamics.)

Typically there is at least some motion between the observer (i.e. the viewer, the camera, or the sensor) and the observed objects or surfaces. From the observer's perspective an object's motion results in a trajectory (a path through space followed in time) with an instantaneous position, velocity, curvature and acceleration, where each of these quantities are functions which express the dimensions as a function of time.

Sometimes moving objects follow simple trajectories that can be fully modeled by elementary physics (for example, satellites, billiard balls, and ballistic projectiles). More often, things are not quite so simple. As an example, in robotics, when tracking grippers in robot arms, the observational system itself may be subject to noisy random or even chaotic multi-dimensional disturbances (rotations, translations, vibrations, or the like) resulting in compound measurement errors which can be considered a form of data flow entropy that furthermore complicates sensor data fusion at a system level.

Furthermore, objects and surfaces that are to be tracked may be non-rigid changing shapes such as, for example, a deformable elastic structure or an organic surface such as a human face. Tracking such a deformable surface or object with high accuracy favors methods with high relative local accuracy. This may, for example, take the form of a highly accurate measurement of the relative 3D displacements between points in a surface mesh. Once detected, such deformable objects and their changing 3D shapes and trajectories need to be positioned within some kind of global context (i.e., a stable reference system.) These local object measurements should be converted to a global spatial-temporal coordinates without a loss of accuracy.

DETAILED DESCRIPTION OF THE INVENTION

Figure 1:
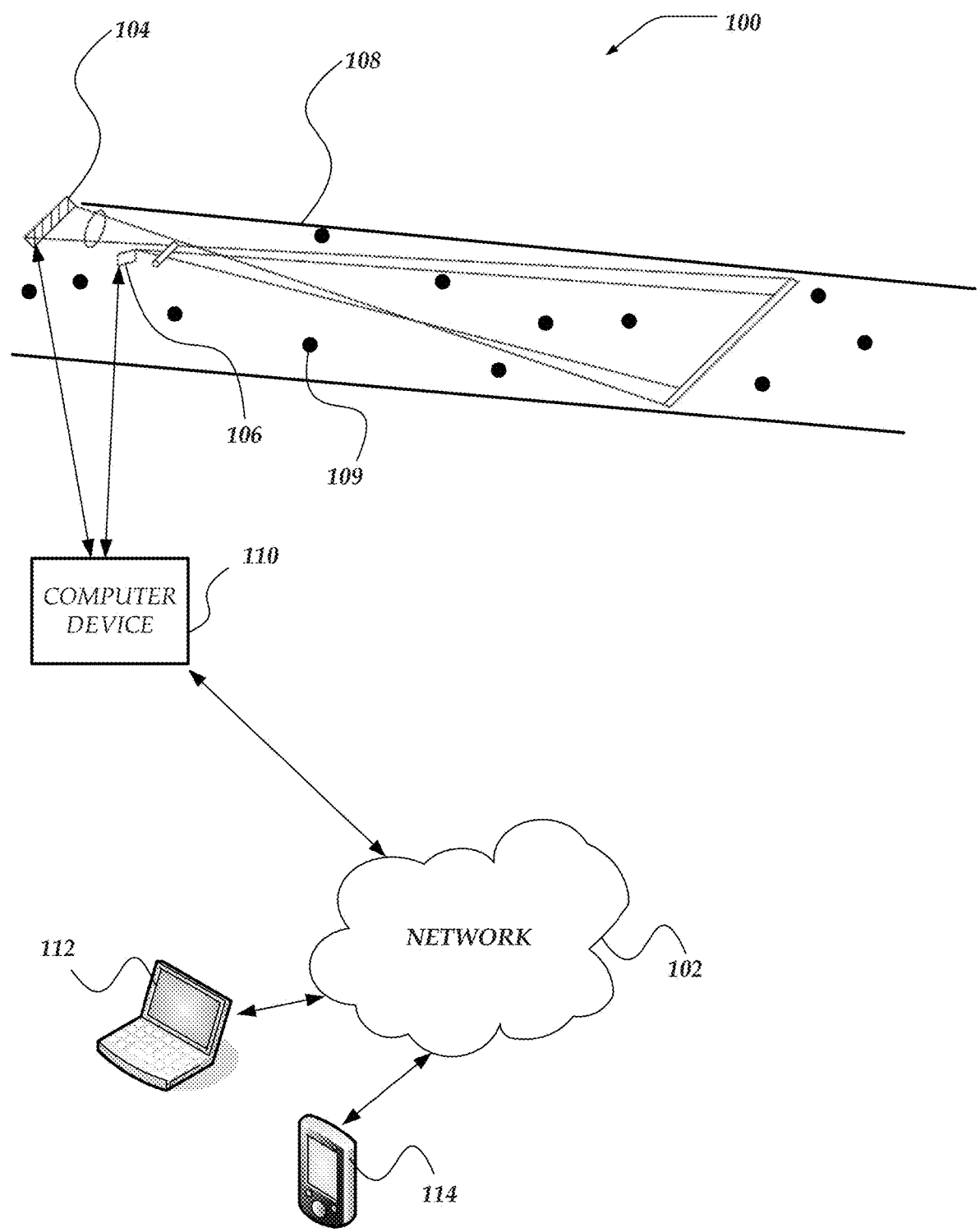
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), an organic light emitting diode (OLED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "camera", "receiver," "photon receiver," "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of one or more photons. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), complementary metal-oxide-semiconductor (CMOS) devices, silicon photomultipliers (SiPM), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. The target may also be referred to as an "object." For instance, a target or object may scatter or reflect an outgoing light beam that is transmitted by various ones of the various embodiments disclosed herein. In the various embodiments described herein, one or more light sources may be in relative motion to one or more of receivers and/or one or more targets or objects. Similarly, one or more receivers may be in relative motion to one or more of light sources and/or one or more targets or objects. One or more targets or objects may be in relative motion to one or more of light sources and/or one or more receivers.

As used herein, the term "voxel" is a sampled surface element of a 3D spatial manifold (for example, a 3D shaped surface.)

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to methods or systems for navigating a vehicle. A scanner is employed to scan a light beam over the surface. Light reflected by one or more fiducial markers on the surface onto pixels of a receiver is employed to determine a spatial arrangement of the fiducial markers on the surface. The spatial arrangement of the fiducial markers is compared with a predetermined map of the fiducial markers to determine a location of the vehicle.

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 100 of FIG. 1 includes a scanner 104 including a light source, at least one receiver (e.g., camera or sensor) 106, and a system computer device 110. The scanner 104 has a light source that emits a light beam (e.g., photons) to sequentially illuminate regions (i.e., voxels, points, lines, areas, or the like) on a surface 108, such as a road, a landing strip, an autonomous vehicular lane or robotic work space. The surface 108 includes fiducial markers 109 which reflect a portion of the light beam back towards the receiver 106. In some embodiments, system 100 may include, or be coupled to, a network 102 and one or more other computers, such as but not limited to a laptop computer 112 and/or a mobile computer, such as but not limited to a smartphone or tablet 114. In some embodiments, the scanner 104 and/or receiver 106 may include one or more components included in a computer, such as but not limited to various ones of computers 110, 112, or 114. The scanner 104 and receiver 106 can be coupled directly to the computer 110, 112, or 114 by any wireless or wired technique or may be coupled to the computer 110, 112, or 114 through a network 102.

The scanner 104 may include one or more light sources for transmitting light or photon beams. Examples of suitable light sources includes lasers, laser diodes, light emitting diodes, organic light emitting diodes, or the like. For instance, the scanner 104 may include one or more visible and/or non-visible laser sources. In at least some embodiments, the scanner 104 includes one or more of a white (W), red (R), a green (G), or a blue (B) light source. In at least some embodiments, the scanner 104 includes at least one each of a red (R), a green (G), and a blue (B) light source. In at least some embodiment, the light source includes one or more non-visible laser sources, such as a near-infrared (NIR) or infrared (IR) laser. A light source may provide continuous or pulsed light beams of a predetermined frequency, or range of frequencies. The provided light beams may be coherent light beams. The scanner 104 may include various ones of the features, components, or functionality of a computer device, including but not limited to mobile computer 200 of FIG. 2 and/or network computer 300 of FIG. 3.

The scanner 104 may also include an optical system that includes optical components to direct or focus the transmitted or outgoing light beams. The optical systems may aim and shape the spatial and temporal beam profiles of outgoing light beams. The optical system may collimate, fan-out, or otherwise manipulate the outgoing light beams. The scanner 104 may include a scanning arrangement that can scan photons as a light beam over the surface 108. In at least some embodiments, the scanner 104 may scan the light beam sequentially along a line or region (for example, along voxels or points of the line or region) of the surface and then the scanner 104 may proceed to scan another line or region. A voxel can be described as a sampled surface element of a 3D spatial manifold (for example, the surface 108.) In at least some embodiments, the voxel is relatively small and may be described as "pixel-sized." In some embodiments, the scanner 105 may simultaneously illuminate a line with the light beam and sequentially scan a series of lines on the surface.

The receiver 106 may include one or more photon-sensitive, or photon-detecting, arrays of sensor pixels. The terms "receiver", "camera", and "sensor" are used interchangeably herein and are used to denote any light or photon detector arrangement unless indicated otherwise. An array of sensor pixels detects continuous or pulsed light beams reflected from the surface 108 or another target. The array of pixels may be a one dimensional-array or a two-dimensional array. The pixels may include SPAD pixels or other photosensitive elements that avalanche upon the illumination one or a few incoming photons. The pixels may have ultra-fast response times in detecting a single or a few photons that are on the order of a few nanoseconds. The pixels may be sensitive to the frequencies emitted or transmitted by scanner 104 and relatively insensitive to other frequencies. Receiver 106 can also include an optical system that includes optical components to direct and focus the received beams, across the array of pixels. Receiver 106 may include various ones of the features, components, or functionality of a computer device, including but not limited to mobile computer 200 of FIG. 2 and/or network computer 300 of FIG. 3.

Various embodiment of computer device 110 are described in more detail below in conjunction with FIGS. 2-3 (e.g., computer device 110 may be an embodiment of client or mobile computer 200 of FIG. 2 and/or network computer 300 of FIG. 3). Briefly, however, computer device 110 includes virtually various computer devices enabled to perform the various navigation or foveation operations, based on the detection of photons reflected from one or more fiducial markers 109 in a surface. Based on the detected photons or light beams, computer device 110 may alter or otherwise modify operation of a vehicle. It should be understood that the functionality of computer device 110 may be performed by scanner 104, receiver 106, or a combination thereof, without communicating to a separate device.

In some embodiments, at least some of the navigation or foveation or other functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including scanner 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In one or more of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between scanner 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Client Computer

Figure 2:
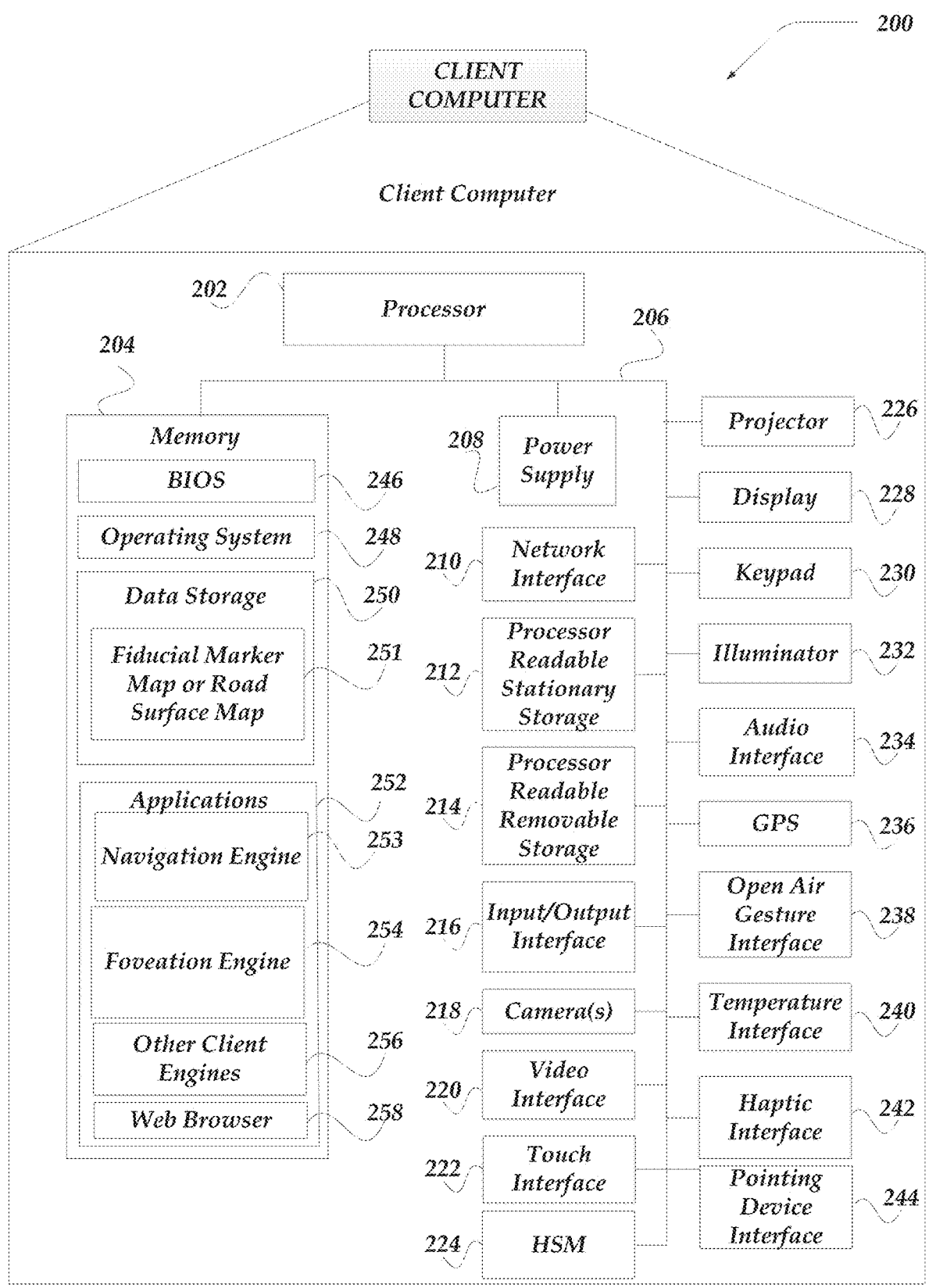
FIG. 2 illustrates an embodiment of an exemplary mobile computer that may be included in a system such as that shown in FIG. 1.

FIG. 2 shows one embodiment of an exemplary client computer 200 that may include many more or less components than those exemplary components shown. Client computer 200 may represent, for example, one or more embodiment of laptop computer 112, smartphone/tablet 114, and/or computer 110 of system 100 of FIG. 1. Thus, client computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer. And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (MC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200. Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX', or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store a fiducial marker map or road surface map 251. The map 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, navigation client engine 253, foveation client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
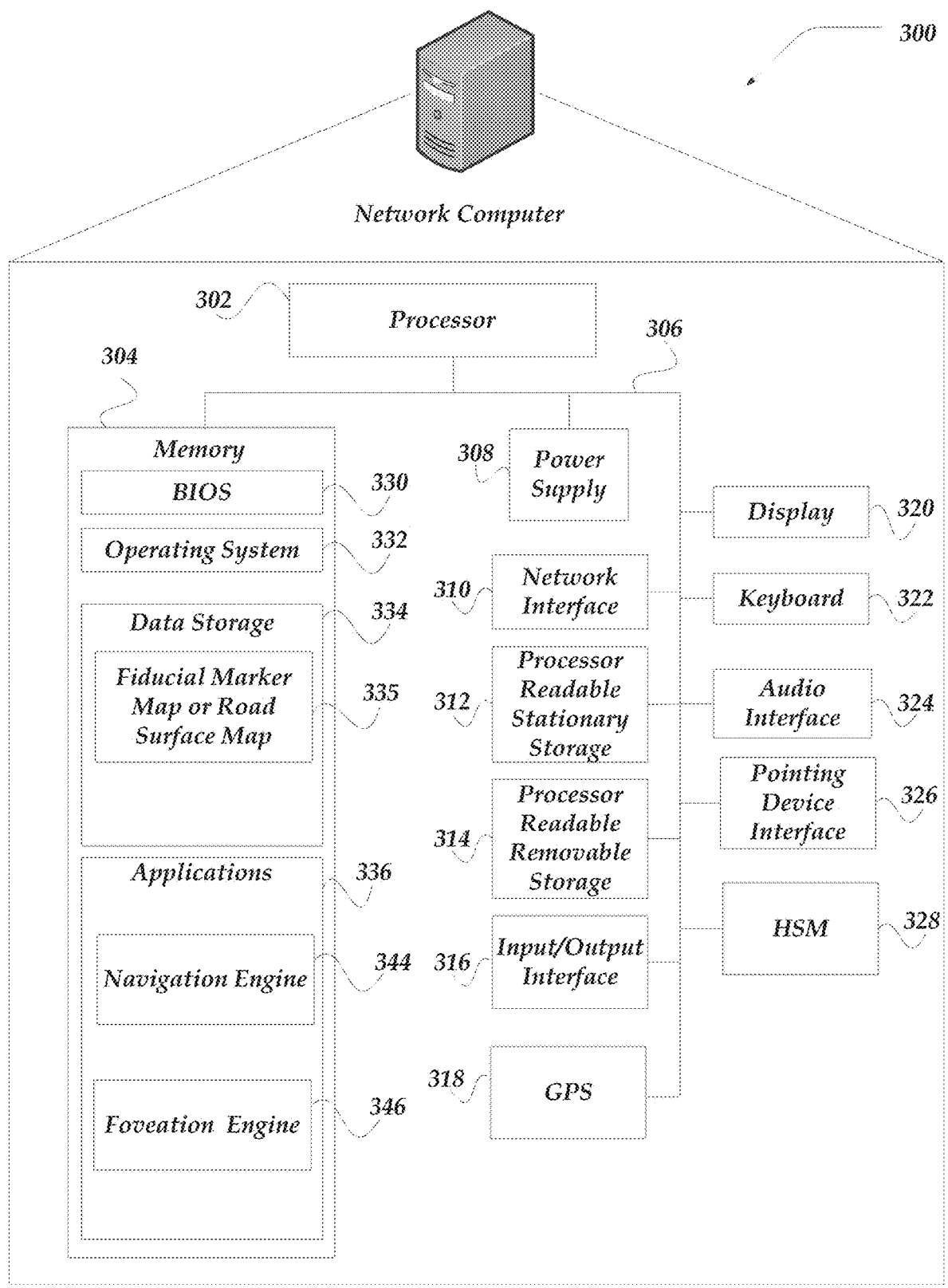
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer.

Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store a fiducial marker map or a road surface map 335. The fiducial marker map or a road surface map 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include navigation engine 344 or foveation engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, navigation engine 344 or foveation engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to navigation engine 344 or foveation engine 346 may be provisioned and de-commissioned automatically.

Also, in one or more of the various embodiments, navigation engine 344 or foveation engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Systems

In complex motion systems it is advantageous that various observers have an accurate, common spatial-temporal reference (for example, a shared "ground truth," or a "terra firma" to stand on.) In the laboratory the purpose of the optical bench is to eliminate the vibrations of the external world. In the laboratory not only motion but also time is highly controlled. Computer vision and other high-performance computing systems often use nanosecond precise clock references.

However, in contrast, the real world is noisy and chaotic. Everything is in constant motion. Signal propagation takes significant time and is often variable, causing signal jitter (for example, unpredictable varying time delays). Furthermore, digital sensors inherently generate quantization errors; data buffers introduce latency; and real world events appear to occur randomly in time, not synchronized to a precise master clock.

High-speed motion tracking systems currently in development (for example, for robotic vision, autonomous navigation, and numerous other applications) have created a need for more precise measurement of spatial dimensions and their time functions. The over-arching objective is to accurately detect, identify and track objects, estimate their positions and motions, and arrive at reliable predictions of their trajectories and deformations.

Most, if not all sensors (including sensors for detecting light or photons) observe relative position and motion, relative velocity (e.g. Doppler acoustics or radar), or change of motion (e.g. inertial sensors) and it is often desirable or even crucial in tracking or positional navigational systems to have some kind of absolute reference or ground truth position on which to anchor a shared coordinate system. Without such an anchor achieving sufficient accuracy can be a challenge, especially in high-velocity, dynamic, or chaotic systems where rapid changes occur in an un-anticipated and unpredictable manner, and where the sensors themselves are in a constant (often unknown or poorly defined) state of motion.

The real world does provide a natural anchoring system: it is the ground we stand on, "Terra Firma" (Latin: solid ground) and which can serve as a global map of the environment, onto which knowledge from all sensors (including sensors for detecting light or photons) can accumulate. For precise navigation such a highly detailed global map is as useful as ancient maps of "Terra Cognita" (Latin: the Known World) were for navigators such Magellan and Columbus. The greater the accuracy, the greater the value and the more information can be synergistically accumulated through successive observations. For example, highly accurate 3D observations from successive independent observers (e.g., by LIDAR or other observation techniques) can enable a crowd sourced ever more fine-grained view of cities, their drivable surfaces, and observable structures.

Light can be used as a spatio-temporal reference. Some recently developed systems, such as for example, scanning LIDARs, use the sequential illumination of the 3D space. A unique, highly accurate 3D motion capture system architecture is the PhotonJet™ imaging architecture, versions of which have been described in U.S. Pat. Nos. 8,282,888; 8,430,512; 8,573,783; 8,696,141; 8,711,370; 8,971,568; 9,377,533; 9,501,176; 9,581,883; 9,753,126; 9,810,913; 9,813,673; 9,946,076; 10,043,282; 10,061,137; 10,067,230; and 10,084,990; and U.S. patent application Ser. Nos. 15/853,783 and 15/976,269, all of which are incorporated herein by reference in their entirety. In a pixel sequential scanning architecture (such as the PhotonJet' imaging architecture), individual pixels (spatial light contrast measurements) and voxels (3D surface position measurements) are observed with pinpoint precision. For example, in at least some embodiments of the PhotonJet™ imaging architecture, the pixels can be measured with a precision of a $\frac{1}{100}^{th}$ of degree and resolved in time in nanosecond intervals.

Cameras are everywhere. In the last 10 years CMOS camera technology has advanced dramatically, in resolution and quantum efficiency, and at the same time their cost has dropped dramatically, a trend primarily driven by mass consumer applications. A 10 megapixel color camera module may now cost less than $10. The same technology curve will in principle enable a 100-megapixel monochrome position sensor IC.

Mass produced, low cost optics developed for cell phone cameras enable the affordable sensor arrays (arrays of low cost camera modules) that are found in 360 degree surround cameras used for VR capture and mounted onto quad copters and autonomous cars, test driving on the roads in the San Francisco Bay Area, Marseille and Singapore. Such "robot transporters" are often festooned with arrays of 10 or more individual, high-resolution sensors.

Properly deployed, such systems are capable of capturing an extremely fine-grained view of the real world around them. For example, a high resolution "4K" camera has 8,000,000 pixels typically arranged in 4000 columns (hence "4k") and 2000 rows. As an example, with good optics, a lens stack with 40 by 20 degree field of view, observes, resolves, measures and tracks the world to 100th of a degree, resolving one inch details at 477 feet (1 cm details at 57.3 m). Tele-focus systems, (such as some satellite and UAV vision systems) with high quality telescopic lenses observe the finest details and are limited by the cost of the system and the laws of optics.

Motion, however, is the enemy of resolution. As photographers have known since the invention of photography 180 years ago, to create a nice family portrait you need good light and a tripod, and everyone has to sit still. High speed object observation takes specially arranged light sources e.g. the high-speed photography using mechanically triggered camera arrays pioneered by Muybridge in 1878 at the Stanford ranch to capture the gait of a galloping horse.

High altitude orbital satellites can see that amazing detail in your backyard because they drift silently, weightlessly through space in a perfectly balanced equilibrium of kinetic and gravitational forces. Only the laws of optics and atmospheric factors such as the weather limit their resolution. An ideal combination of large optics, perfectly cooled sensors and a total absence of vibrations enable leisurely long exposures that result in extremely accurate, noise free, giga-pixel images from high above in our sky.

On or just above the earth's surface, achieving even a $1000^{th}$ of that image quality is challenging. Unfortunately for UAVs, quad copters, Paparazzi on motorcycles and (soon) autonomous taxis, even the best high-speed sensors and state of the art motion stabilizers cannot fully eliminate the debilitating effects of a bumpy ride, the vibration of motors, rotors and a shaking fuselage. Action equals reaction: the same fundamentals from Newtonian physics that enable the supreme quality of satellite images impose drastic limits on the performance and image quality of non-celestial systems.

Accurate high-velocity observation is challenging when high-speed motions are observed and experienced at the same time. High pixel counts enable accuracy, but to achieve sharp image contrast (for example, to observe an edge of a vehicle racing towards the finish line) each pixel may need at least 1000 photons. The higher the pixel count and the greater the distance the more that becomes a problem. The problem is insufficiency of instantaneously available photons ("photon starvation".) Given a certain lens aperture size even the best quality optics can only capture an infinitesimally small proportion of the light reflected off or emitted by a far object.

Global shutter cameras are often used in high-speed motion capture and currently dominate autonomous navigation applications. In such systems only one photon may on average arrive at any one of the pixels in the camera in any microsecond, so an exposure time of at least 1 millisecond may be required to achieve a sufficiently sharp photo-finish image. At a short 1-millisecond exposure a speeding car (50 m/s) may still move 2 inches or more. A high-resolution camera with, for example, 40 degrees lateral view and a 4K sensor has 100 pixels per degree across the field of view. Such a 4K camera observing a vehicle crossing the finish line from a 5-meter distance would experience a significant motion blur of more than 50 pixels. However, to reduce this unfortunate motion blur to only one pixel the light intensity would be increased 50× during exposure to reduce the exposure time to $\frac{1}{50}^{th}$, that is, to 20 microseconds rather than 1 millisecond.

Camera motion means short frame exposure times to reduce blur. Another significant challenge is that all motorized transport platforms vibrate due to motor vibrations and wheel and/or rotor impacts. As an example, at 6000 RMP a Tesla model 3 engine generates mechanical vibrations at 100 Hz while providing 100 kW of power enabling it to accelerate from 0 to 60 mph in 5.6 seconds. The motor's AC drive system creates additional higher frequency harmonic vibrations.

To improve the power-to-weight ratio, various electric vehicle (EV) suppliers are working on powerful but light EV motors that will run at 20,000 RPM. These vehicles generate mechanical shock waves at frequencies between 100 to 333 Hz. All mechanical things vibrate and these low frequency vibrations will propagate despite the best dampening techniques. The frequencies of these vibrations are similar to the powerful bass sound frequencies generated by car audio systems. Low frequencies are very energetic and fundamentally hard to absorb. Such vibrations inevitably reach the cameras and other sensors in autonomous mobility platforms. There is an ongoing industry effort to deliver a quieter, smoother ride by, for example, deploying noise-canceling shock absorbers and cabin active noise cancelation systems, such as pioneered by Bose™ acoustics.

However, any transport platform (i.e., vehicle) when moving at great speed through air will experience some turbulence. Navigational cameras are typically embedded in the front surface of the hull against which air collides more turbulently as the vehicle's velocity increases.

To navigate at greater speed autonomous vehicles should see traffic in fine detail further ahead. At 70 mph or higher, 4K resolution ($\frac{1}{100}^{th}$ degree voxels) may be needed. In at least some instances, this is the resolution to be able to distinguish at a sufficient distance a pedestrian from a cyclist or a car sharing a road surface. Such resolution insures that there is sufficient time to detect an obstacle, to make the appropriate classification, and to choose and successfully execute the correct collision avoidance maneuver.

Figure 4:
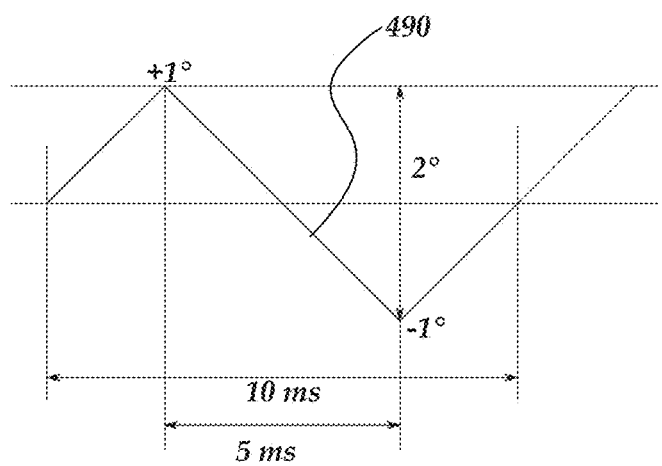
FIG. 4 shown the effect of camera vibration on motion blur of images.

FIG. 4 is a diagram illustrating an example of camera vibration. Assume a camera module vibrates at 100 Hz+/−1 degree diagonally (as illustrated by line 490) across the field of view, as illustrated in FIG. 1. This will move the camera at a speed of up to 400 degrees per second (i.e., two degrees in 5 ms). If, at rest, the camera's optics and sensor can resolve images to $\frac{1}{100}$th of a degree, then a 100 Hz vibration may cause rotational vibration blur (blur caused by the camera's optical axis rotating) of 40,000 pixels per second (400 degrees/s multiplied by 100 pixels per degree). From the camera's perspective the world is shaking across its field of view with fine detail flying from one pixel to the next adjacent pixel every 25 microseconds ($\frac{1}{40,000}^{th}$ of a second). This implies that nothing close to the optical specification of the camera system can be observed once the car starts accelerating. For example, when an autonomous car merges from an on-ramp and accelerates onto a freeway, it will need to focus its vision system farther ahead to check the road for obstructions and plan the correct merge maneuver, but this blurring can be a challenge to that vision system. The same critical requirements exist when passing or avoiding a sudden road hazard on an undivided two-lane country road. Oncoming traffic needs to be spotted and identified. The velocity heading and likely trajectory needs to be estimated correctly with short latency at significant distances. With at best only a few seconds to a frontal collision, any camera motion blur could reduce the system's perception capabilities and ability to avoid collision.

Illumination can be key factor. Headlights are less powerful at greater distances due to $1/R^2$ reflection losses. New automotive lighting systems aim for greater and more concentrated power, employing high performance LED arrays collimated into highly focused but non-blinding "smart" high beams. Since longer exposure times are often not an option to make more photons available, greater camera apertures may use expensive full frame size sensors (24 by 36 mm) coupled with expensive optics.

Current automotive vision systems tend to employ global shutter cameras with an enhanced dynamic range. Additional pixel logic may be needed to support high frame-rates feeding pixel data into accurate analog to digital converters, driving up the cost of these systems very rapidly.

In contrast to conventional arrangements, in at least some embodiments, a sequential image acquisition system, such a that illustrated in FIG. 1, can take just a few nanoseconds to acquire a precise voxel position estimation when scanning a 3D manifold using methods that are described in the various PhotonJet' imaging architecture patent documents referenced above. In a pixel sequential image acquisition systems (also, called pixel sequential perception systems) a laser beam scans successive pixel-sized segments in the field of view (FoV). The short, intense laser illumination of individual voxels reduces or eliminates motion blur, because there can be no significant shift in position between the camera and the voxel during acquisition. During a 10-nanosecond pixel illumination, $10^{-8}$ seconds, a speeding car with a velocity of 50 m/s (180 km/h) moves only half a micron (50 m/s for 10 nanoseconds). In line sequential image acquisition systems (also called line sequential perception systems) the light source can simultaneously illuminate any entire line (or a multi-pixel portion of a line). Pixel and line sequential image acquisition systems both include the light source 106 and camera 104 illustrated in FIG. 1.

A pixel sequential image acquisition system (which can include the PhotonJet™ imaging architecture described in the references cited herein) may complete the scan of an entire line of 2000 pixels (for example, 2000 individual sequential observations of approximately one square millimeter of road surface) in approximately 20 microseconds ($2\times10^{-5}$ sec).

Figure 5A:
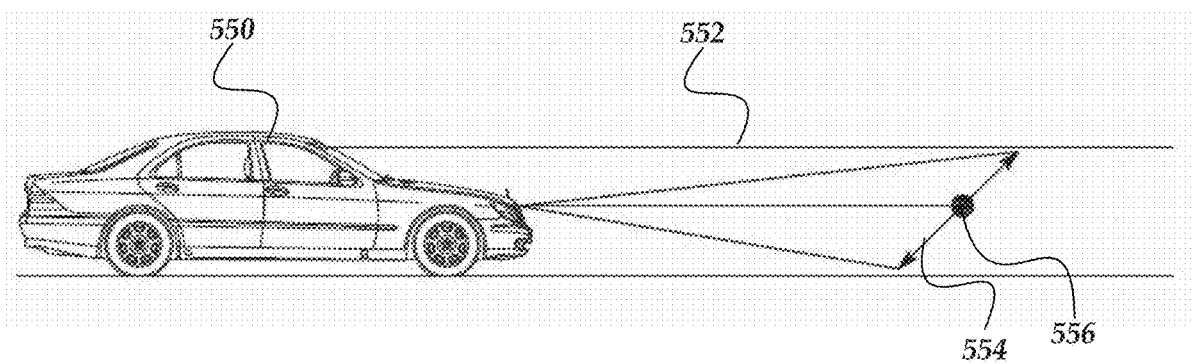
FIG. 5A illustrates one embodiment of scanning point illumination.

FIG. 5A illustrates a vehicle 550 with a pixel sequential perception system that sequentially scans a line 554 of a surface 552 (such as a road) divided into 2000 positions 556 (e.g., pixels or voxels) at a rate of 10 ns/position to provide a total scan time of the line 554 at 20 microseconds. Alternatively, in at least some embodiments, a line sequential perception system, such as a system with laser strobe headlights, can illuminate the whole line 554 simultaneously for 20 microseconds. In that time interval a car speeding at 50 meters per second moves only one millimeter.

Figure 5B:
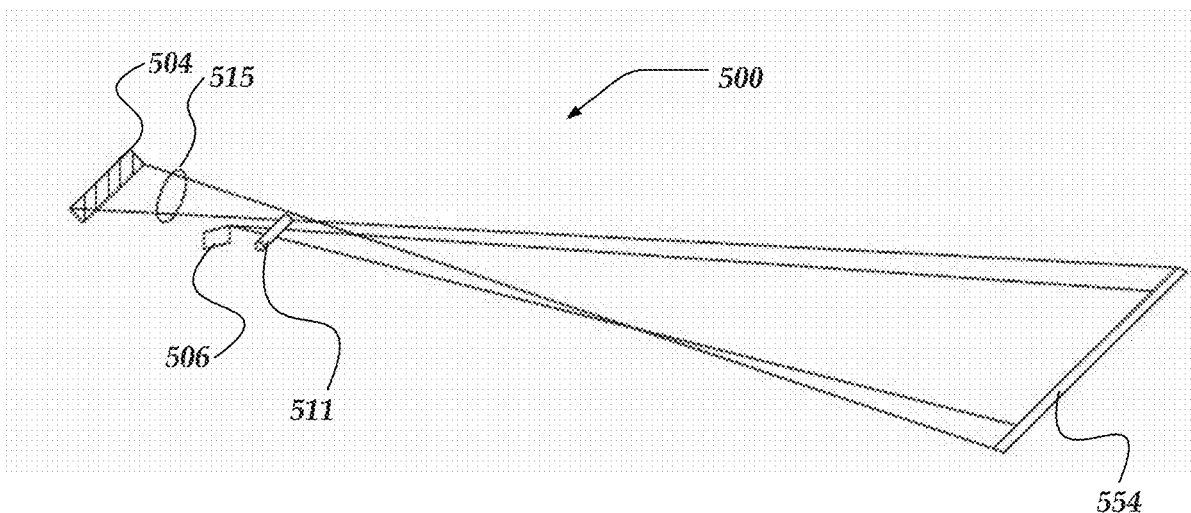
FIG. 5B illustrates one embodiment of strobed line illumination.

FIG. 5B illustrates a line sequential perception system 500 that may include a light source 506, such as a laser, (and any associated optics 511) that illuminates a line 554 (or in other embodiments of pixel sequential perception systems, sequentially illuminates pixels, positions, or voxels along a line) and is synchronized with a linear pixel array camera 504 or other sensor or receiver (and any associated optics such as a lens 515). As an example, the 445 nm light from a powerful (for example, 3 W) blue laser diode can be collimated along its fast axis into a sharply focused laser line illumination of the road surface. Such a system rakes a narrow stripe across the field of view, such as the road just ahead of the vehicle. In at least some embodiments, the light source 506 and camera 504 are located in one or both headlights of the vehicle 550. In other embodiments, these elements may be located elsewhere on a vehicle.

Alternatively, a line sequential perception system may produce a scan line that moves vertically across a rectangular FoV strobing successive lines along the road. If each line takes 20 microseconds, a system can take in 50,000 lines per second. If the focus was set to illuminate and view a region that is 1 mm in width per line, then the system could cover the entire drivable road surface ahead, each square mm, at speeds up to 180 km per hour. At slower speeds the successive frames acquired could overlap. For example, at a more moderate driving speed of 25 meters per second (approx. 55 mph) the successive frames could overlap by 50%.

Figure 6:
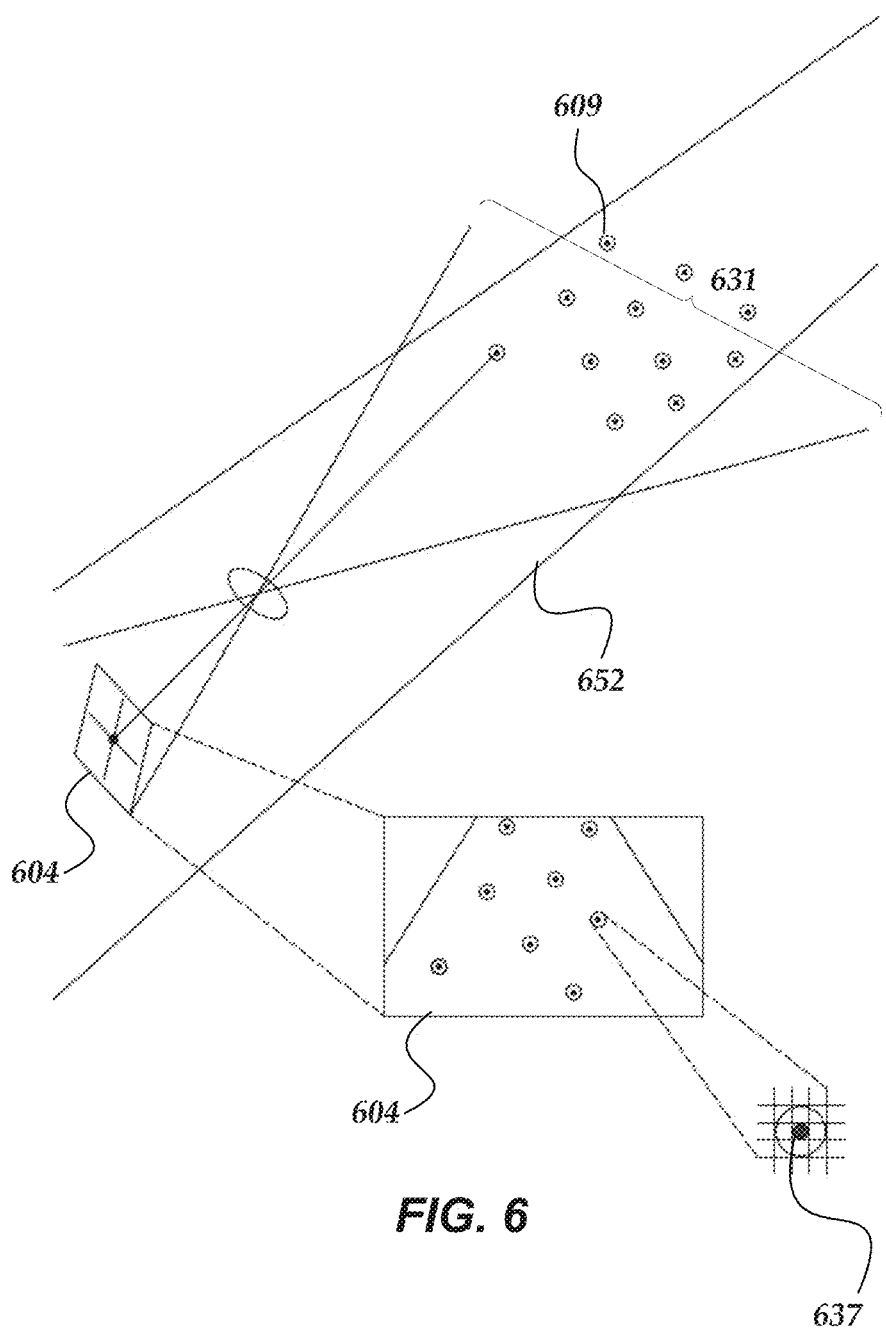
FIG. 6 illustrates one embodiment of a scanning illumination system for observing fiducial makers in a surface.

In this manner, illumination, either in a pixel line sequential perception system or a line sequential perception system, can reduce or eliminate sources of motion blur. FIG. 6 illustrates one embodiment of a system that includes one or more light sources (not shown), for example, lasers or light-emitting diodes, that scan a light beam across the field of view 631. One or more cameras 604 observe the reflections of the light beam as it illuminates a surface 652, such as a road surface. Small, preferably retro-reflective, fiducial markers 609 are embedded in the surface in an irregular pattern. These fiducial markers 609 strongly and preferentially reflect the scanning beam's light back to the camera(s) 604. These point reflections are focused by the camera optics into sharp illuminated spots 637 on the camera's surface. One such spot 637 may be approximately the size of a pixel in the camera 604, or the spot may be smaller than the pixel, falling wholly within a pixel at times, or it may be larger than a pixel and illuminate several pixels at the same time. In the latter case a centroid of the spot may be calculated by a processor using, for example, the greyscale of each of the pixels.

Randomly spread across the surface, the fiducial markers 609 are relatively scarce occurrences, covering only a small part of the total road surface 604. In at least some embodiments, the fiducial markers 609 are (statistically) widely spaced apart from each other so that there are significant dark areas around each illuminated fiducial marker. The fiducial markers reflect brightly and are easy to detect. Filtering at the camera, and optionally in the material or construction of reflecting fiducial markers themselves, greatly favors the reflection and detection of illumination wavelength.

For example, when a single narrowband light source, such as a 405 nm VioletBlue ("DeepBlue") or a 445 nm Blue laser beam, is used for scanning there are methods, such as described in U.S. Pat. No. 8,282,222 and other references cited above, which ensure that only the laser wavelength is reflected. Furthermore, in certain retroreflectors, such as cubic or hexagonal reflections (described, for example, in U.S. Pat. Nos. 9,810,913 and 9,946,076, both of which are incorporated herein by reference in their entirety), the reflected light is highly concentrated and observable only within a very narrow retro-reflection cone which is centered on the incident ray (coming from the scanning light source) back toward the light source. Thus, it can be arranged that such retro-reflective markers 609 would be easily detected even at larger distances and in full daylight by sensors placed in close proximity to the scanning laser source.

Further, as described in, for example, U.S. Pat. No. 9,753,126 and other references cited above, in at least some embodiments the camera 604 may be configured so that the sensing pixels of the camera are sequentially activated and synchronous with the anticipated motion of the scanning beam of light, so that any such reflections are preferentially received while spurious ambient light and other unwanted signals are pre-emptively filtered out.

In at least some embodiments, one or more of three complementary methods can be used to filter out or disambiguate the system's scanning signal reflections from ambient and other spurious noise. First, spatial filtering methods, such as using reflective and refractive optics, can be employed. In at least some embodiments, by using retroreflecting fiducial markers 609, the transmitted beam is only seen returning at or near the location of the light source. On arrival of this retro-reflected light, the optical system (for example, the lens) of the camera 604 can further sort according to incoming direction, matching each incoming chief ray direction with a specific pixel.

Second, temporal filtering methods (for example, signal timing or gating) can be used. Because the scanning beam of light moves in a known, observable, time sequential pattern, selective synchronized sequential activation of one or just a small block of pixels highly favors reflected light arriving in that area over a very narrow (for example, microsecond) time slot.

Third, wavelength filtering methods (for example, narrow band pass filters or special reflection coatings, such as Bragg coatings) can be used. In at least some embodiments, the light source can be narrow band and can be matched by a narrow band pass structure in one or both of the retro-reflective markers 609 or the camera 604.

As an example, a 445 nm Blue laser source is highly collimated and scanned, for example, in a 1D line scan or a 2D pixel scan pattern, across the field of view illuminating small portions of the field of view in rapid succession. Retro-reflecting markers embedded in the surface selectively reflect just one wavelength of the light back in the direction of the light source. There may be multiple light sources such as, for example, one light source in each of two or more headlight assemblies. On arrival at the camera, the retro-reflected narrow band light passes through a narrow-band pass filter, and is collimated to a specific pixel in the camera. Using the known spatio-temporal scan pattern of the scanning light source, the receiving pixels of the camera are activated just before the light arrives and deactivated immediately afterwards. The latter may be automatic, (for example, the self-quenching logic found in SPADs can be added to gated receiver arrays of all types (rolling shutter, twitchy pixel or SPAD array)). When, if any, of the reflected light illuminates the camera, even when the signal amounts to just 10 photons in the case of SPAD receivers, the retro-reflected light will be detected. Through any combination of one or more of the filtering methods described above, the selectivity of this system is such that a relatively small amount of reflected light (for example, retinal safe low power beam generated by a blue laser source) is sufficient for observation even in full sunlight, with a signal to noise of 1,000,000 to 1 or greater advantage over sun light from ambient sources or other system's light sources.

In at least some embodiments, the systems are arranged so that the beams of light from the transporter (e.g., vehicle) scan the road surface directly ahead (for example, the volume of 3D space in its planned trajectory) and the system determines possible alternative paths in real time (for example, a multi path arrangement) while monitoring other road users and possible obstructions and hazards such as cars, pedestrians, bicycles, dogs, road debris, tumble weeds, and the like. In at least some embodiments, this system calculates and re-calculates one or more possible safe paths around obstacles while checking the transporter's current six DoF system kinetics, velocity, acceleration, pitch, roll & yaw, and the like and, in some embodiments, may consult available telematics on the state of its road hugging system (for example, how well the wheels are each gripping their piece of the road right now and what is the prognosis for the next 30 feet ahead). In at least some embodiments, the state of road ahead is described by an update of the rut, grip, bump, wetness and oil slick on a map (such as a detailed road condition or micro-obstacle map) which may be provided via V2X (vehicle-to-everything), V2V (vehicle-to-vehicle, which may be updated just minutes ago by previous cars in the lane) or perhaps at the outset of each commute downloaded by the charging system, or, in the case of mobility services, at a recharging or fueling station, or as part of an en-route, on-the-go energy and data provisioning along specific corridors installed in frequently travelled road grid sections by the consortium of mobility transport service providers or by any other suitable arrangement or mechanism.

In at least some embodiments, a laser beam or other light source of the system can illuminate a few fiducial markers which are arranged in a specific sequence (for example, green-blue-red-green-red-blue-blue, see FIG. 16) where each marker is unique, surrounded by a suitable masking tar or road surface colored paint or adhesive. Each marker is retro-reflective and brightly reflects the white or RGB (red-green-blue) laser beam in its specific primary color. The stereo or trifocal (or multi camera) system instantly computes the 3D positions of the observed fiducial markers. In at least some embodiments, the time of transition is also noted, for example, using a nanosecond precision clock. Even when using a rolling shutter system the system can match the observed 3D positions of the fiducial markers in its FoV from the vehicle's machine vision Ego-perspective; that is, when viewed from the vehicle's view there are N colored fiducial points seen ahead where the road should be. These points should fit a surface where, when connecting the points with graphs, the resulting polygonal mesh meshes (i.e., fits) the known (or prior provided) 3D fiducial map.

In at least some embodiments, if some fiducial markers were missed or lost by normal wear and tear of the road surface there is a simple sufficiency (for example, a number) of observations (i.e., a hamming distance) where uniqueness of the sequence of detected colors and their positions in the surface will achieve a level of statistical certainty suitable for the navigational task at hand.

As the road surface wears out, this would be detected automatically, and periodically more fiducial markers can be added as a repair, or whole sections may be resurfaced as roads frequently are already. Worn out areas might be resurfaced by applying a fresh thin layer (for example, 3 mm) of grit in a tar-like dark adhesive matrix material with randomly distributed fiducial markers. Maps may be updated, adding portions with new fiducial markers in the resurfaced road segments.

Once the observed color pattern has been fitted onto the detailed prior map, the vehicle navigation system knows exactly where it is. In at least some embodiments, the degree of fit may be an indicator of certainty and of the quality or statistical accuracy of the derived information. In at least some embodiments, each observation is correlated with a microsecond observational time, since the scanner's (i.e., light source's) position follows a known periodic function. In at least some embodiments, the observed scan trajectory can be continuously re-calibrated each time the beam illuminates a known fiducial location embedded in the road's surface. In at least some embodiments, the 3D trajectory of the vehicle and its six DoF dynamics can be estimated to a high degree of precision. For example, the vehicle's drift or cant (e.g., leaning, pitch, or roll) during steep turns can be nearly instantaneously detected and, at least in some embodiments, corrected using, for example, by an active suspension system.

In at least some embodiments, the system and vehicle will be able to know exactly (for example, to 1 cm in 3 dimensions) where it is, where it is heading, and what its current "drift" or rotation, yaw and pitch is with respect to the main motion trajectory. In at least some embodiments, the system or vehicle can detect minute changes at the beginning of skids, roll, bounces, or the like, and may correct for these nearly instantly as appropriate, enabling pin point precise micro-steering, a feature that is possibly life saving for Collision Imminent Steering (CIS).

The reflections of beam delays can be used as additional ToF measures. If the beam from the light sources scans fast, and the retro-reflective fiducial markers are recognized and their known positions are looked up by the navigation system, then further refinements can be made because of the elapsed time of flight ("ToF") after the illumination by the beam. For example, the moment of exact illumination can be deduced from the scan pattern and the distance as described, for example, in U.S. Pat. No. 10,067,230, incorporated herein by reference. As an example, if the beam scans such a position in approximately 10 nanoseconds (for example, a 20 microsecond line sweep with 2000 potential positions) then the observational moment per each fiducial marker would be retarded by the distance from the fiducial back to the camera. For example, at 100 m, the fiducial marker spatial registration would be delayed by 300 nanoseconds.

A pixel sequential perception system (or line sequential perception system) can scan, learn, and then recognize every square mm of a road. This system can see both the location of a voxel and the color or grey scale (reflectivity) of that surface in nanoseconds. For example, a 25 kHz resonant MEMS scanning mirror moves an illumination laser spot, from a light source, scanning at 50,000 lines a second across a 2 meter wide swath of the road ahead. If the laser spot scans the road over voxels that are 1 mm in diameter, in 20 microseconds the laser spot moves across 2 meters of the road ahead. The tip of the beam traverses the road rapidly back and forth, sweeping orthogonally to the direction of travel.

The light source might only scan in a single direction, for example, in the lateral direction (horizontally from the camera's perspective, across the pavement in front of or below the vehicle), or it may also be capable of a longitudinal deflection (vertically from the sensor's perspective, along the trajectory ahead). In either case, in at least some embodiments, successive lines can be scanned at 50,000 lines per second.

Figure 7A:
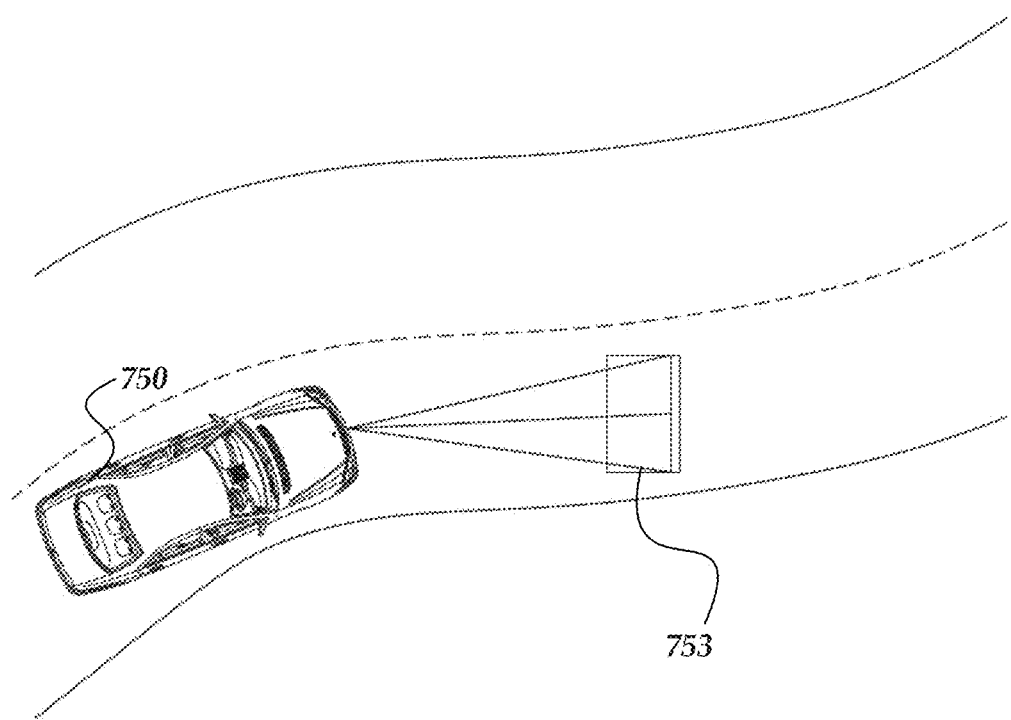
FIG. 7A is a top view illustrating a vehicle utilizing one embodiment of system for scanning a road and navigating the vehicle.
Figure 7B:
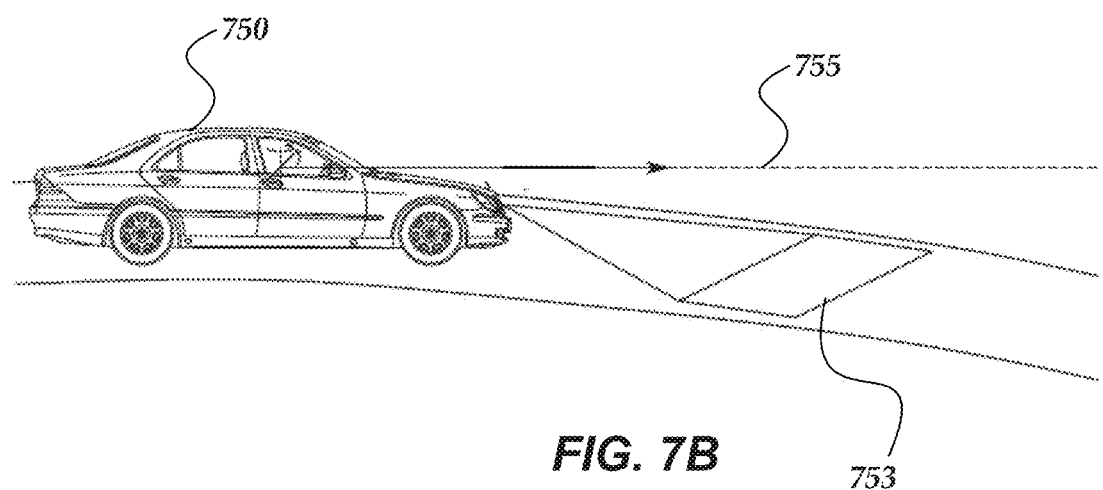
FIG. 7B is a side view of the vehicle and embodiment of FIG. 7B.

If the longitudinal (vertical) direction scan system illuminates 1000 line segments of 1 mm by 2000 mm, scanning 2 meters of successive and adjacent stripes across the road ahead, the system in a vehicle 750 has scanned every square mm in a 2 square meter section 753 of the road ahead, as illustrated in FIGS. 7A and 7B. Every one of these 2 million square millimeters has been illuminated individually for approximately 10 nanoseconds, taking a total of 20 milliseconds to scan this one 1×2 meter section of the road ahead. Clearly if coupled (or synchronized) with a 2 Megapixel rolling shutter camera, the system can scan the road ahead in a fine grained detail at speeds up to 50 meters per second (180 km per hour, approximately 111 mph).

A drivable road surface has been mapped using the systems described above. In at least some embodiments, the resulting map can contain both voxel location information (for example, a mm accurate 3D profile of the surface) and pixel contrast information (for example, a mm accurate image with all contrast visible details of the road grid.) This may be useful as the hard crushed aggregate embedded in the tar matrix makes the road surface non-slip and can be detected in the pixel contrast information. The map also contains markers such as road paint, cat-eye reflectors, and fiducial markers as described above. Further, the map may contain any other location information pertinent to the road condition, such as, for example, rutting, likelihood of hydroplaning, other wear conditions, or the likelihood of the formation of black ice. This kind of ultra-local road information may be based on actual incidences or accidents, or observations by vehicles ahead and, in at least some embodiments, may added to the map as specific local conditions nearly in real time.

In some embodiments, the map may provide precise details about the surface ahead such as the slope or grittiness (for example, the surface roughness, bumps, or the like). The cant of the road of the drivable surface can be known by the system (for example, an autonomous navigation system) well ahead of any required maneuver, whether routine progression during a commute or just in case of emergency evasion or collision avoidance. The system can be always aware of the road ahead, with kilometers of road surface data loaded in active system memory. A terabyte of flash memory, the amount available in the most recent mobile phones, could hold a mm accurate map of a 1000 km road.

Given the vehicle characteristics, the road characteristics and the traffic situation the vehicle can choose the appropriate speed and create an optical "flight plan" for the road ahead, analogous to the flight plan submitted by airline crew ahead of a flight that takes into account wind conditions, weather and other traffic.

As an example, the system may adjust the height of the suspension for the smoothness of the road ahead, and take into account the wind conditions, required stability in steep turns, the vehicle's loading, or the like. Anticipating some bumps the system can adjust the height of the carriage briefly upwards smoothly gliding over bumps, such as bumpy transitions that often occur at bridges or when part of the road is in progress of being re-surfaced. This "flight plan" 755 can be a 3D trajectory for the vehicle's main cabin to "fly" or "glide" and may be much smoother than the trajectory of the vehicle's under-carriage which the wheels actually follow.

Thus the wheels individually and as an under carriage function mechanically to maintain an optimal grip on the road, whereas the sensitive cargo or passengers experience an optimal smooth ride, in a "glide path" that is planned and executed by the system.

Many multi-axle vehicles re-tract and off-load each of their wheels just an instant before stepping up and over road surface defects and re-engage with the better surface afterwards. In electrical vehicles (EVs) the weight of the battery pack typically outweighs all other system components. As an example, in a Tesla model 3, 30% of the total vehicle weight or approximately 1000 pounds (about 454 kg) is the 100 kWh battery pack. In ultra-light single person vehicles using advanced aircraft materials or novel ultra-light and ultra-strong laser sintered titanium honeycomb structural frames, the ratio may be even more extreme.

Further, on novel high-speed long distance AEV (autonomous electric vehicle) highway lanes, great speeds (180 km per hour) can be achieved over great distances with a wireless energy transfer to the vehicle through the driving surface. For maximum speed, stability and power transfer efficiency it is desirable that the vehicle's frame, which carries the batteries, "hugs the road" as close as possible. Thus it will by necessity experience at least some of the unavoidable road imperfections. There is no need for the passenger to experience these.

Figure 8A:
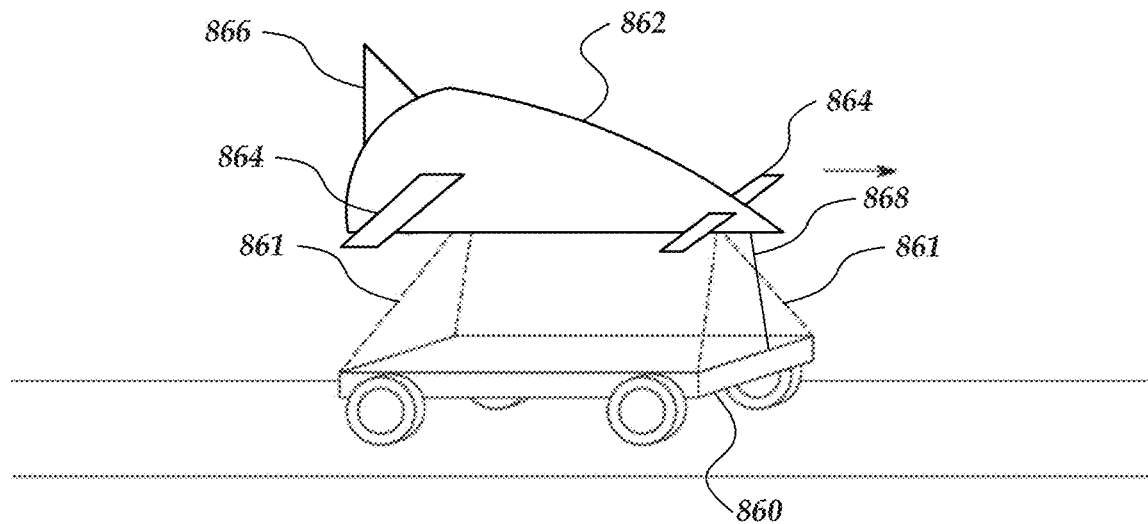
FIG. 8A is a side perspective view of one embodiment of a vehicle utilizing a navigation system to operate an active suspension between the cabin portion and undercarriage of the vehicle.

Using inertial sensors in the cabin floor or the passenger seat, an active suspension system can anticipate each of the road trajectory's bumps and effectively cancels it out. In at least some embodiments, as illustrated in FIG. 8A, there are two suspension systems, one system for the undercarriage 860 with the batteries, power system, and wheels, and a separate system 861 above the first system to smooth out the remainder of bumps and motor and steering effects for the cabin section 862 (passenger compartment). In some embodiments, the passenger compartment may include optional ailerons 864 or a rudder 866. The second suspension system 861 can be active and react to changes in the road surface. A tether 868 may couple the cabin section 862 to the undercarriage 860. In at least some embodiments, this arrangement can provide an ultra-quiet cabin and enable the passenger(s) to sleep even when cruising at 300 km per hour on straight stretches of recently upgraded "super AEV highways".

Figure 8B:
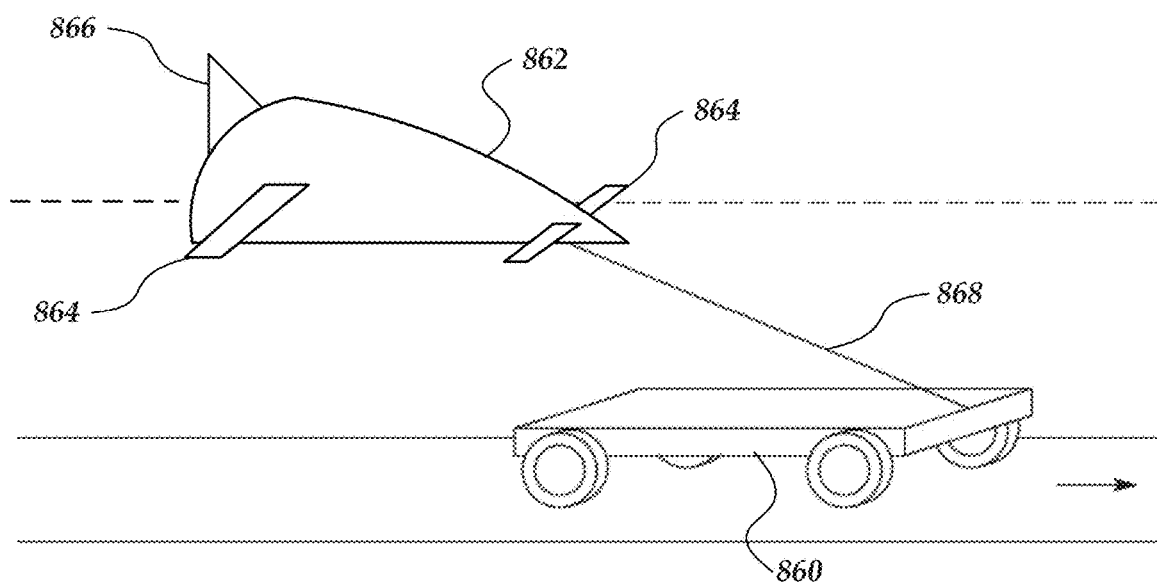
FIG. 8B is a side perspective view of another embodiment of a vehicle with a cabin portion attached to an undercarriage.

FIG. 8B shows another example of an undercarriage 860 and cabin section 862. In at least some embodiments, an inductive magnetic charging system is embedded in an ultra-fast AEV lane adding an electromagnetic down force to the undercarriage 860 ensuring road adhesion for the wheels of the undercarriage to better grip the road. In addition, rather than using an active suspension the cabin section 862 may just separate (but held by the tether 868), and literally fly above and behind the under carriage using ailerons 864 and a small rudder 866 to smooth out the ride along the flight path just above the road surface.

According to JIEDDO, the Joint IED Defeat Organization (USA Today reported on Dec. 19, 2013, as told by Thomas Friedman in his book "Thank You for Being Late") more than half the Americans killed (3,100) or wounded (33,000) in the Iraq and Afghanistan wars have been victims of IEDs (Improvised Explosive Devices) planted in the ground.

Figure 9:
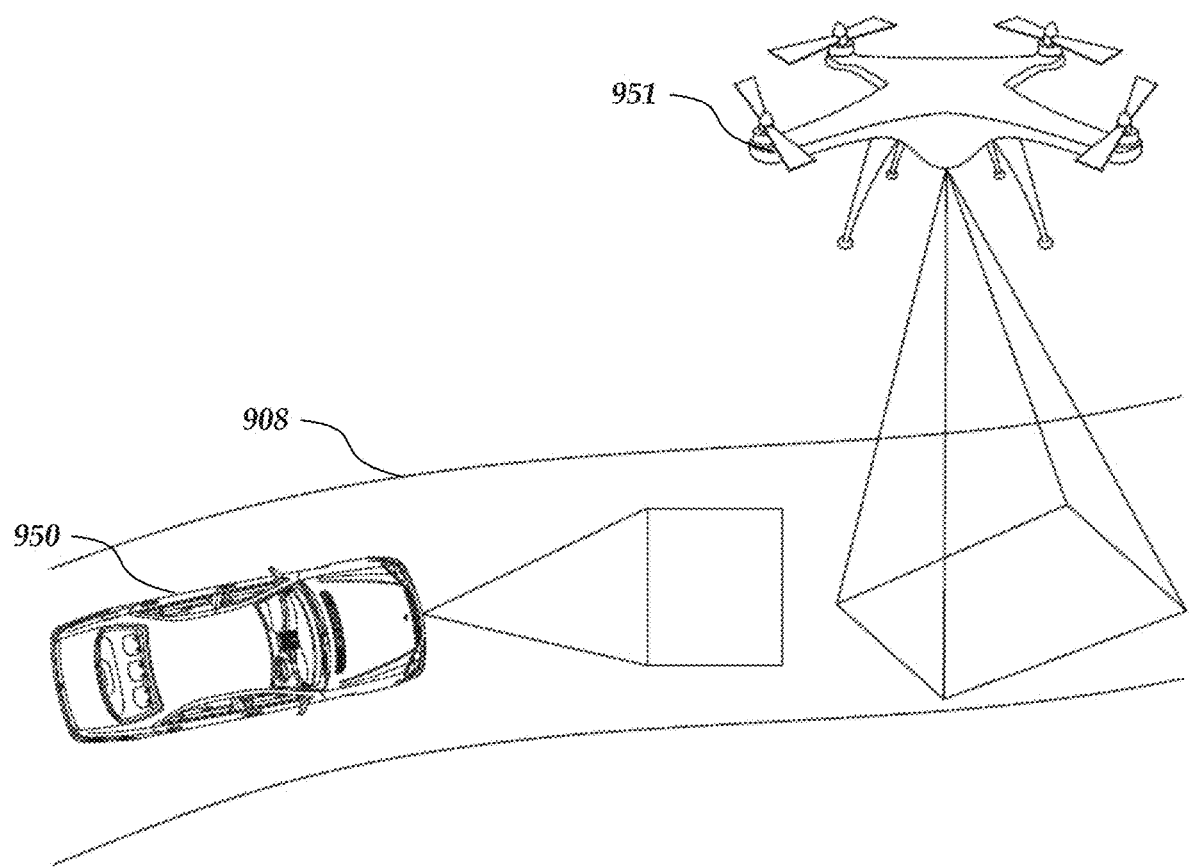
FIG. 9 is a top view of a vehicle and a UAV utilizing a navigation system to detect IEDs or other objects.

As illustrated in FIG. 9, in addition to the vehicle 950, a remote controlled or autonomous vehicle 951 (for example, a quadcopter or a drone) can move along a paved road 908 scanning the road in its path at speeds up to 50 meters per second (more than 100 miles per hour) using the systems and methods described above. This second vehicle 951 may never touch the road, but flies above the pavement at speeds of, for example, 50 meters per second, around, for example, 1 meter or more above the pavement. Recording and comparing the surface daily for even minute changes will confirm that the surface of the pavement and surrounding banks of dirt were truly undisturbed. Thus, the current state of the pavement is compared to prior observations to ensure it has not been tampered with. Roads could be paved with a coat of pseudo randomly placed fiducial markers to prevent counterfeiting.

One advantage of the systems is that only the pavement is scanned rather than the whole environment. Other systems, such as Road DNA™ by TomTom™, scan the whole ambient environment of the vehicle as it would be seen by drivers. The RoadDNA™ system constructs a map of walls, buildings, and other structures that line the road. To construct this map, the privacy of homes, gardens and private spaces of people is unavoidably invaded. The company says it removes such acquired information. However this implies that large sections would be redacted out.

By contrast, the systems described above only use public surfaces (or private road surfaces) which typically contain no private information. Therefore, there is no privacy invasion. The system only sees road surfaces it drives on and, optionally, any vehicles or obstructions on the road. The system may map your private driveway's surface but this information can be kept off line, if so desired.

Figure 10:
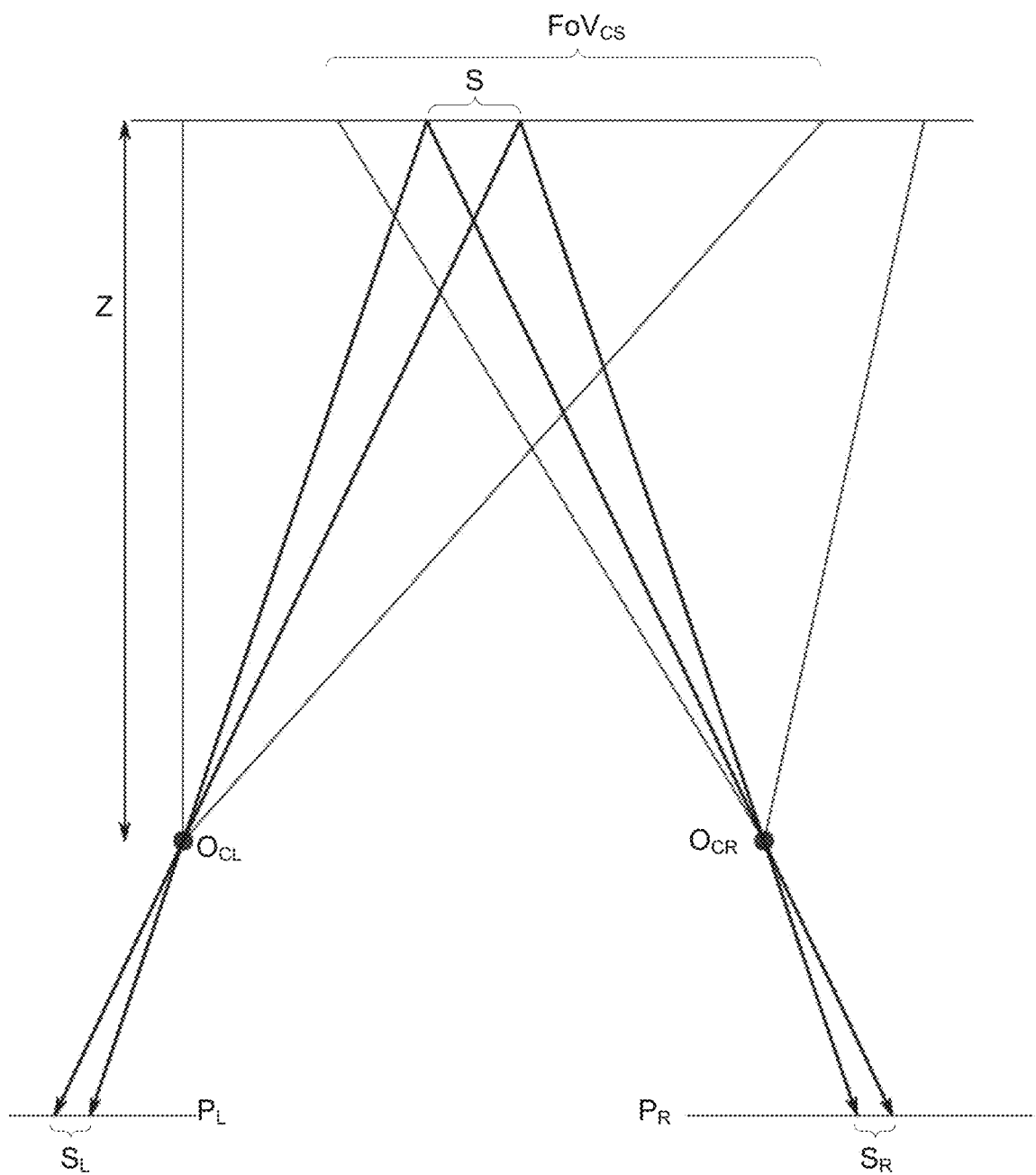
FIG. 10 illustrates a diagram of light beams for fast foveated perception.

Light beams from light sources can enable Fast Foveated Perception (FFP). A vehicle is equipped with two scanning headlight assemblies. In each headlight assembly there is at least one camera. Preferably, the camera projection center is substantially co-located with the projection center of the scanning headlight. The camera may be mounted with a relay mirror that closely (substantially) aligns the optical axis of camera optics, i.e. the camera's FoV, with the FoV scanned by the headlight. In this exemplary case illustrated in FIG. 10 there are two headlight assemblies and two cameras having sensor planes $P_L$ and $P_R$, respectively, and optical projection centers $O_{CL}$ and OCR, respectively. In other embodiments, it is possible to have just one scanning headlight.

The two cameras have at least a partially overlapping area in their individuals FoV. This is the camera stereo field of view, $FoV_{cs}$. A bright illumination spot S is projected by one (or both) of the scanning headlights, and reflects off an object in the $FoV_{cs}$ at a distance Z from the vehicle. The two cameras activate respective subset portions of their sensors that match the reflected images $S_L$, $S_R$ of the spot S in each of their sensors.

The spot illumination interval is very brief, for example, only 100 microseconds. There may be, for example, up to 100 fractions making up the total $FoV_{cs}$ which the system can illuminate individually, selectively and sequentially. One such fraction, at a scanning frame rate of 100 fps, is illuminated and exposed for 100 microseconds: a $1/100^{th}$ fraction of a full frame exposure of 10 msec.

The activation (shuttering) of subareas in the sensors might be equally brief because an intelligent, dynamic, illumination control system can anticipate and selectively activate the location of the foveated light's reflected image in the sensor, and sequentially move that location in the sensor along a trajectory that matches the flying illumination spot's trajectory across the FoV.

In at least some embodiments, a light source (or a pair of light sources) selectively illuminate the spot S and a pair of stereo cameras only send a small subset of exposed pixels from each camera back to an image processing system or a machine vision system due to the selective activation of camera pixels. This not only increases contrast and decreases acquisition time, it further significantly lowers the total system latency by reducing the total amount of pixels that need to be transmitted, resulting in a smoother stream of nearly blur free pixels. Furthermore, it reduces the computational complexity, and therefore the autonomous driving system, or collision avoidance system, can be more agile and respond faster to, for example, hard-to-detect small, dark road debris.

Figure 11:
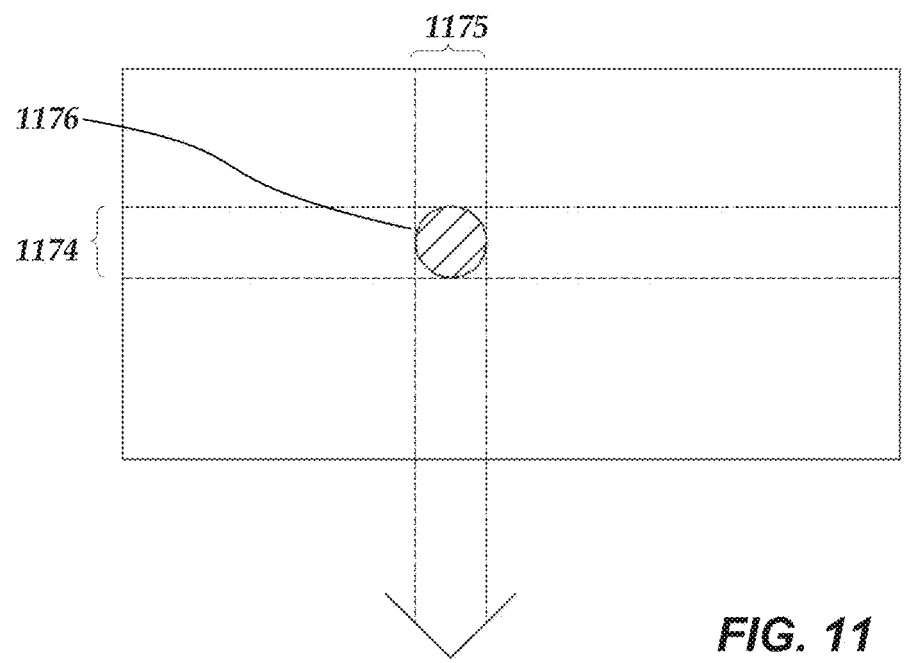
FIG. 11 illustrates an area of interest located on pixels of a camera.

In at least some embodiments, a smart active illuminated machine vision system can activate a group (for example, a bundle, ribbon or band) of rows in a conventional rolling shutter camera sensor. Rolling shutter sensors are quite inexpensive and have already been deployed as cameras in mobile phones. For example, a mobile facing camera may have 2 million pixels arranged in 2000 columns and 1000 rows. In such a camera a rolling band of 100 rows ($1/10^{th}$ portion of the whole sensor) can be selectively exposed (reset and activated) and read out. Further, as illustrated in FIG. 11, the system may select to read and transmit only pixel data from a subset of rows 1174 and a subset of columns 1175 (for example, the area of interest 1176).

In at least some embodiments, circuitry added to the camera Analog to Digital (A2D) decoder can select just pixels with exposures above (and/or below) a certain dynamic signal threshold. These thresholds may be set to ensure that objects within a certain range are recorded. Due to the steep drop off (typically $1/r^2$) a small and diminishing fraction of the scanning spot light is reflected by objects and surfaces at larger distances. Effectively then only those objects or surfaces within a certain range reflect enough light to be captured by the camera's aperture, and only those are recorded after illumination by a known-to-be-sufficient strobe illumination level energy.

This illumination level and the sensors' threshold settings can be controlled by the same system. The selected pixel data are transferred for further processing in the sensor's local circuitry, or downstream using, for example, perceptual algorithms or AI functions (for example, CNN—convoluted neural network) which parse and crop, associating certain select pixels as groups into objects and then attempt to assign them classes, adding object classification labels such as vehicle, bicycle, pedestrian, or the like.

In at least some embodiments, there can also be a maximum exposure threshold, to flag over-illuminated objects or surfaces in the foreground. Such over-illuminated, over-exposed, or saturated pixels were most likely too close and might already have been processed and classified in earlier frames. This function would also help ignore (for example, mask out) raindrops and snowflakes, removing them at this moment. The latter function might help keep snow and rain from occluding objects of interest.

Figure 12:
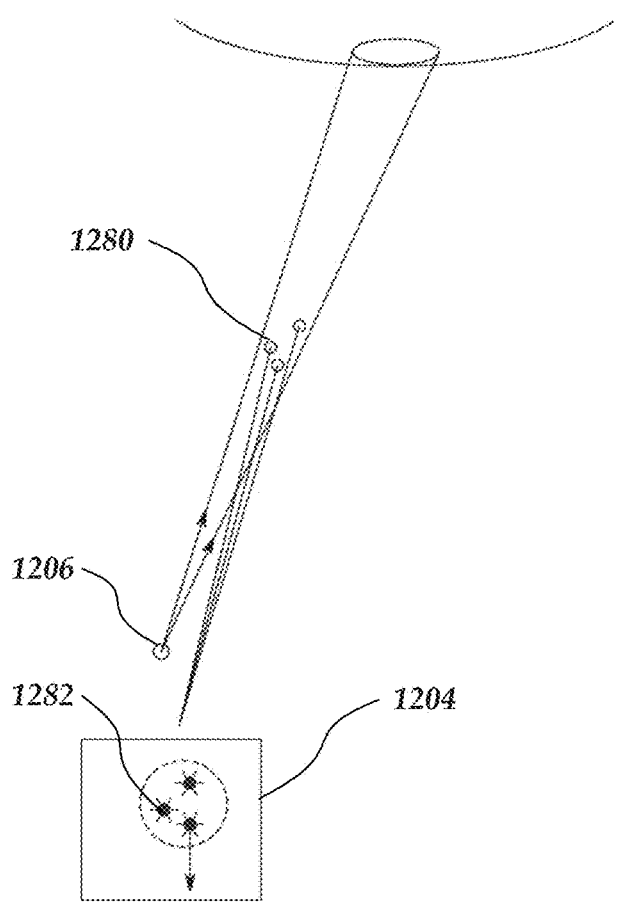
FIG. 12 illustrates operation of a system that masks out raindrops or snow.

For example, in FIG. 12, raindrops 1280 are masked out as the camera 1204 sees over-exposed pixels 1282 due to retro-reflecting a small portion of the light of the light source 1206 and due to the proximity of the raindrops in the foreground. The raindrops are effectively removed from the image by the system, keeping the raindrops from adding unnecessary ambiguity to the machine vision system examining the object of interest at a farther distance.

Figure 13A:
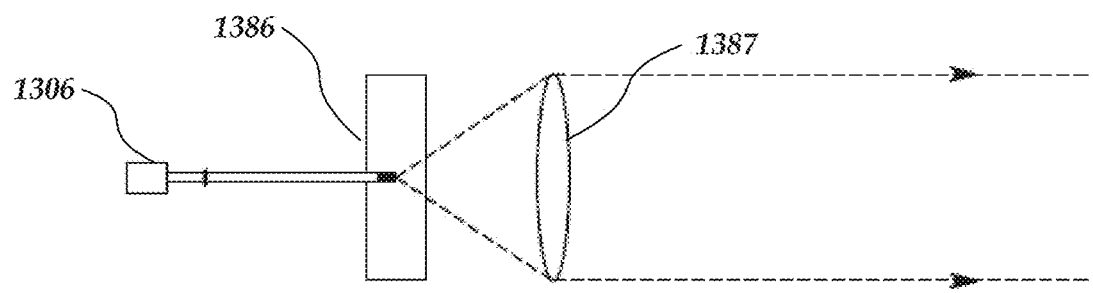
FIG. 13A illustrates a headlight arrangement with a light source and phosphor.
Figure 13B:
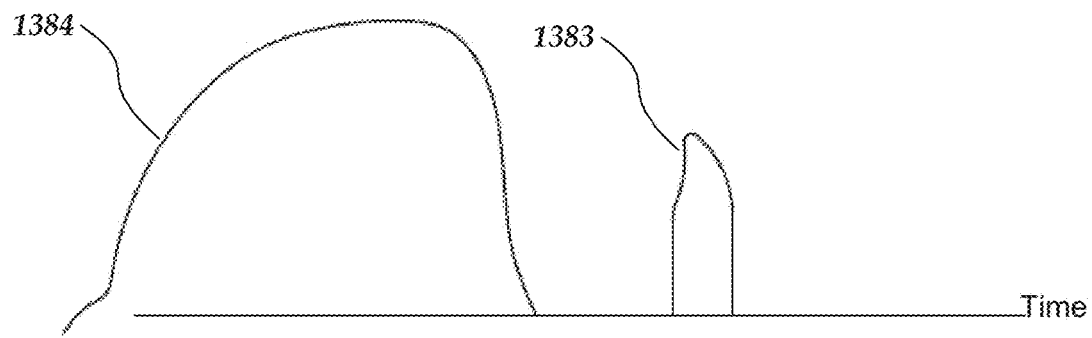
FIG. 13B illustrates light emitted by the headlight arrangement of FIG. 13A over time.
Figure 13C:
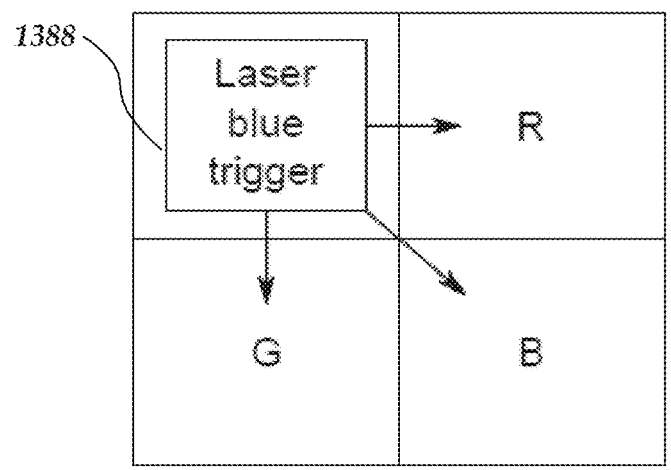
FIG. 13C illustrates a narrowband filtered pixel in an array that receives laser blue light and triggers adjacent red (R), green (G), and blue (B) pixels.

Turning to FIGS. 13A-13C, a headlight can include a light source 1306, a phosphor 1386 and a recollimator 1387. The light emitted by the headlight, has two components: a first portion 1383, about 20% of it, consists of the diffused and incoherent form of the original short wavelength coherent laser source 1306, for example, a 445 nm laser. The rest 1384 consists of Stokes shifted (absorbed and re-emitted) fluorescent photons of a range of longer wavelengths across the spectrum (blue, cyan, green, yellow and red). This fluorescence energy conversion takes time. The longer wavelengths emitted by the phosphor 1386 emerge with a delay after the blue higher energy photons have been absorbed by the phosphor. Circuitry 1388 in the sensor can be arranged to exploit this delay so that the first to arrive blue (for example, narrow band laser light 445 nm) photons trigger adjacent, nearby RGB (for example, Bayer pattern) filtered pixels (labeled "R", "G", and "B" in FIG. 13C) just as the delayed broad band wave arrives. FIG. 13B shows an the first to arrive narrow band pulse 1383 trailed by a later pulse 1384 of broad band light of longer wavelengths.

Narrow band pass (for example, Bragg type) filters on the photodiodes that act as triggers effectively can shield out the ambient light. Since the broad band (RGB) pixels are only activated for a short duration of the broadband pulse this just-in time-trigger function can effectively block out ambient light.

Figure 14:
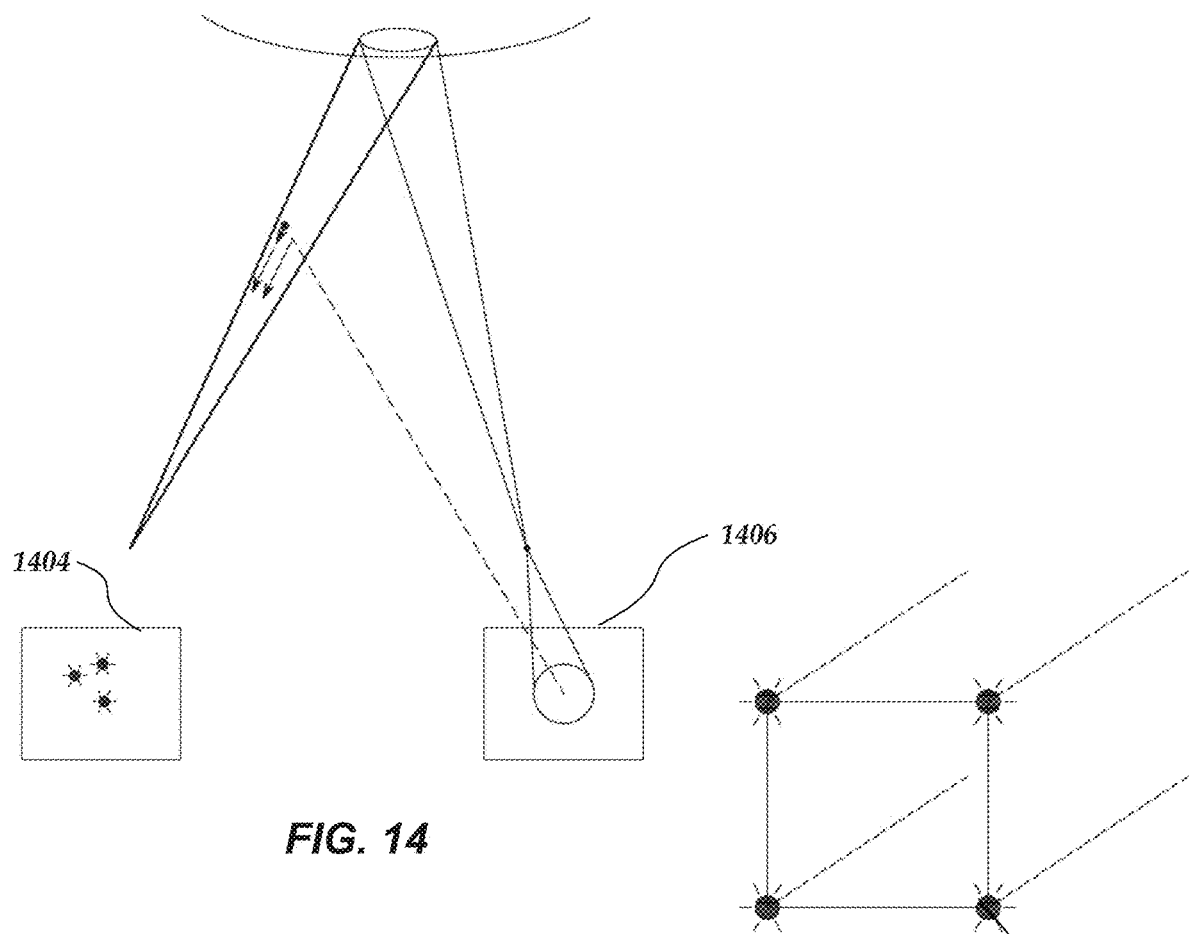
FIG. 14 illustrates an arrangement for alternating stereo cross illumination.

Raindrops retro-reflect, reflecting light back extra brightly towards the source of the light. Therefore, having two lights set wide apart and having the opposing camera look at objects of interest the $FoV_{cs}$ helps not being blinded. For example, as illustrated in FIG. 14, the left camera 1404 looks at object illuminated by right beam 1406, and vice versa.

Alternating stereo cross illumination (ASCI) helps the computer vision system not being blinded by the head lights, for example, in the case of rain or snow, and also would help mitigate the blinding effect of conspicuity type retro-reflective markers such as cat eye reflectors and other retro-reflectors that are found everywhere on and around roads (for example, on the rear of most vehicles, on clothing, helmets and shoes, on traffic signs, and nearly all road surface markings).

In at least some embodiments, the system may choose to focus (for example, selectively foveate) on these retro-reflective (RR) type of markers using a scan cycle with a lower light intensity with an appropriately high set threshold to spot only these exceptionally bright retro-reflective markers. The system alternates between such "spot marking RR" cycles (specifically targeting RR type markers) and "masking RR" cycles (specifically ignoring RR type markers), and then later on during downstream post-processing combines two such alternating scans in rapid succession. This form of data fusion enables the system to maintain a dynamic map that tracks the current traffic environment around the vehicle.

Figure 15:
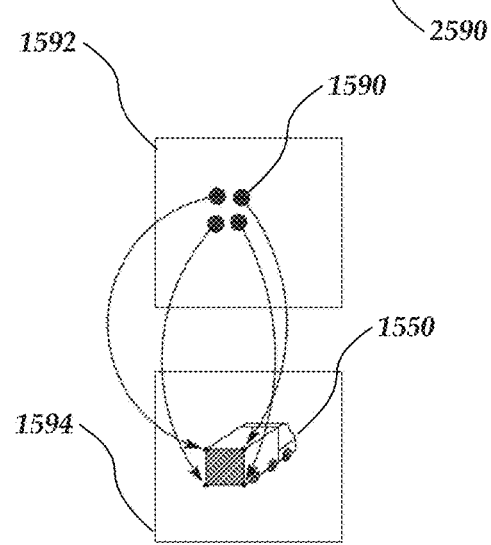
FIG. 15 illustrates operation of alternating retroreflective fiducial detection cycles.

Bright retro reflectors are easily and quickly spot-marked in specific dedicated "spot marking RR" scans, and later these RR positions then assist image capture as they are recognized and noted in alternating high contrast image capture cycles. For example, as illustrated in FIG. 15, four bright spots 1590 in a "spot marking RR" scan 1592 can correspond to the vertices on the back of a truck 1550 identified in a "masking RR" scan 1593.

In at least some embodiments, the system can include a laser spot RR marking process. Firstly, the system marks only those pixels bright enough to exceed the minimum illumination threshold (such as foveating in the far field—for example, farther than 30 meters away). In a second cycle, the system notes (not as grey scale value, bur rather a binary RR flag set and associate it with that pixel) the pixels exceeding a maximum exposure threshold and matches them up with pixels (for example, pixel locations in the $FOV_{cs}$ of the previous observations). This (Min-Max cycle) method would help to very accurately find, position and track the bright RR marked features and associate these fiducial features correctly with less conspicuous (non-RR) features of the objects they belong to. For example, in FIG. 15, the reflectors 1590 on the rear of a truck or, in other example, signs with RR and non-RR markings.

In at least some embodiments, a Blue laser light may be used selectively to spot-mark the RR markers using dedicated blue (for example, 405 nm) narrowband filtered cameras. Simultaneously, regular RGB cameras might observe the same view blocking out the laser primary with a narrowband blocking filter. The advantage is that the fiducial markers can be tracked this way easily in daylight and at night using very little energy while the RGB cameras can use light from ambient sources and/or just light provided by the vehicles from broad-spectrum headlights to observe the road surface and objects on the road.

Embodiments, however, are not limited to only one or two cameras or light sources. It may be advantageous to have three or more cameras illuminated by a plurality of light sources, analogous to examples described in, for example, U.S. Patent Application Publication No. 2018/0180733, incorporated herein by reference in its entirety. In this multiview architecture. a laser pointer or laser brush illuminates a trajectory of individual voxels with a rapidly scanning "pin prick" laser illumination beam, and the series of illuminated voxels are observed with three or more cameras.

In at least some embodiments, a robot delivery vehicle (or any other suitable vehicle) might have a third top mounted camera that would be deliberately positioned far away from the lower mounted stereo pair of headlights and cameras.

The third camera would be less susceptible to being blinded by retro-reflectors illuminated by the actively scanning headlights below. A further advantage is that it could look father ahead from its elevated position, looking over the top of other vehicles and obstacles.

A third scanning illuminator could also help in looking for door handles, address signs and potential obstructions overhead. It may illuminate obstacles such as trees & shrubs, and enable the system to spot their branches and other protrusions and obstacles jutting across a vehicle's path along, for example, a narrow route.

Figure 16A:
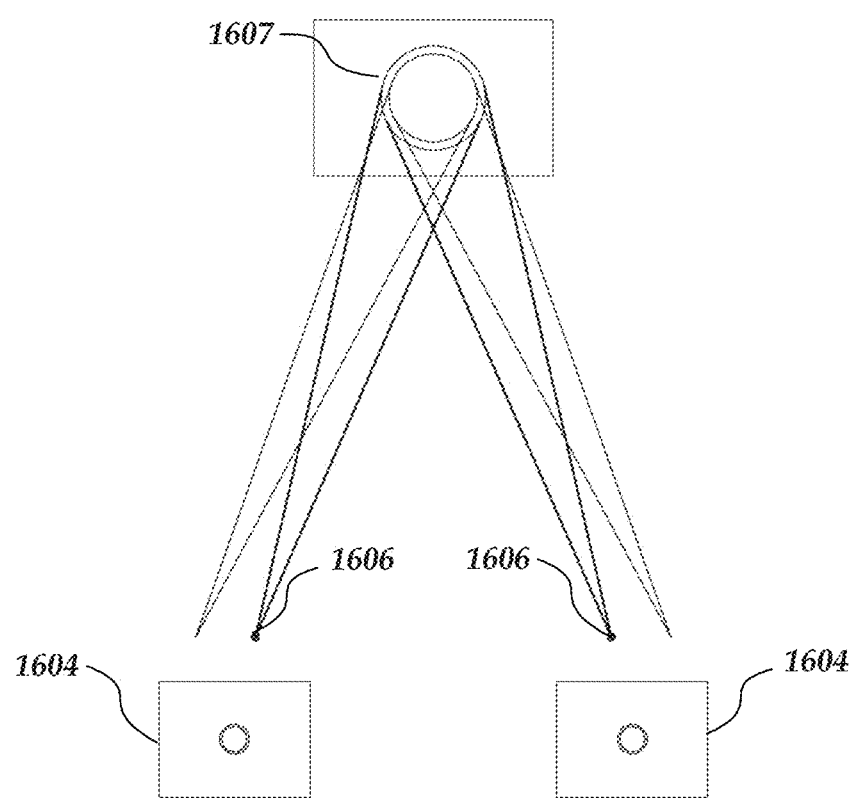
FIG. 16A illustrates an arrangement for observing a common field of view using two cameras and light sources.

In FIG. 16A, two or more projectors (i.e., light sources) 1606 are configured to illuminate, and two or more cameras 1604 are configured to observe, a common (at least partially overlapping or shared) field of view 1607. The projectors (i.e., light sources) are scanning type projectors, preferably highly collimated in a narrow illumination beam. Optionally, the light is generated by a Chrystal Phosphor Fluorescent source that converts at least part of an incident intense blue or UV laser source into a broad-spectrum ("white") illumination. But it may also be a diffused or wider highly collimated monochrome beam. The illumination creates a spot on remote surfaces and objects. The reflection of this spot is observable by the cameras 1604 in each camera-projector pair, as well as by at least one of the other cameras in the system. Ideally, the cameras and projectors in each camera-projector pair are substantially co-located, i.e. they share the same perspectives and share their elevation and azimuth rotation coordinates of the illumination.

Figure 16B:
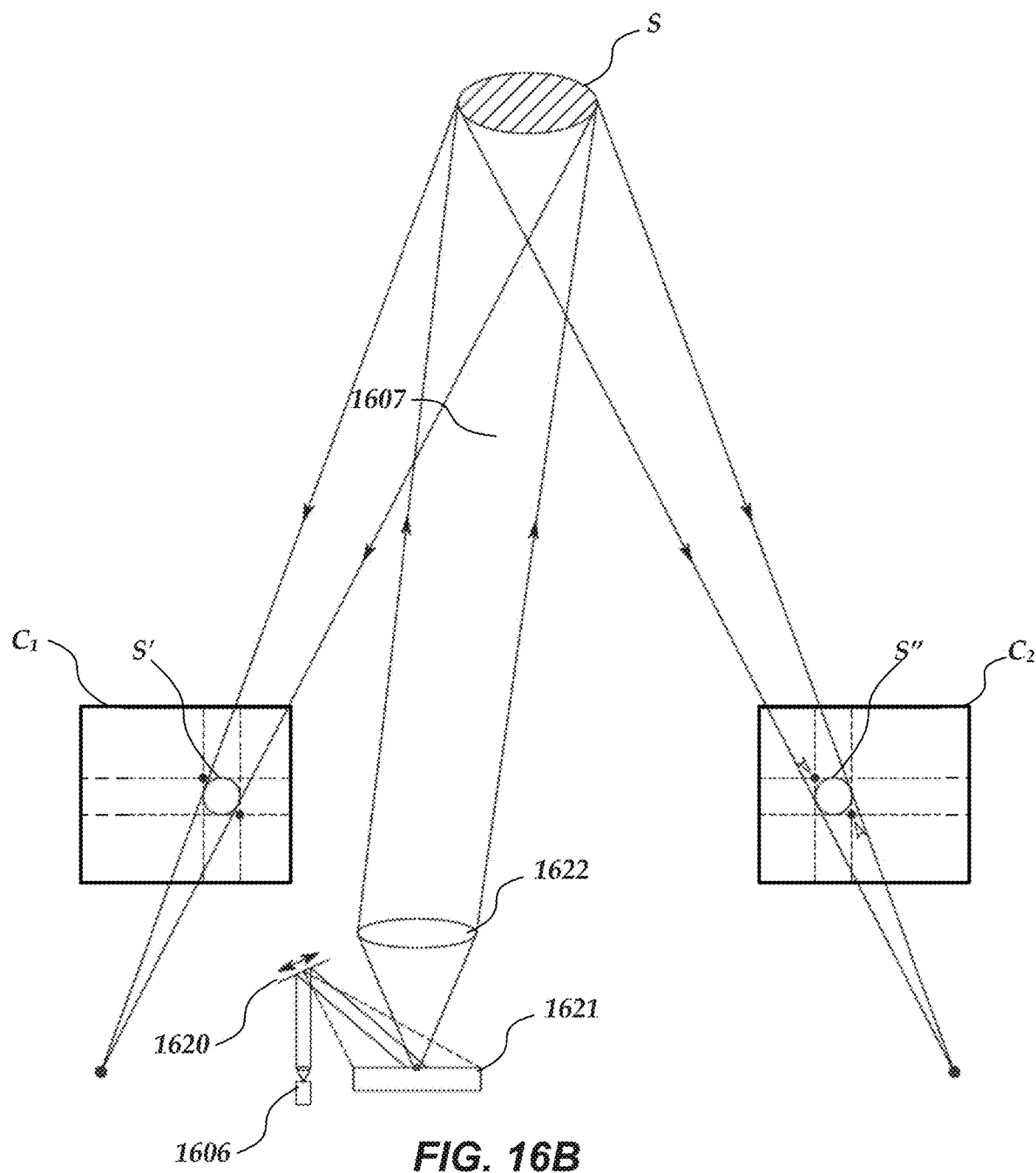
FIG. 16B illustrates an arrangement for observing a common field of view using two cameras and one light source.

FIG. 16B illustrate an arrangement with one light source 1606 and two cameras $C_1$, $C_2$. It will be understood in other embodiments, there may be separate light source associate with each camera. FIG. 16B also illustrates a scanning mechanism 1620, reflector/phosphor 1621, and collimator 1622. The light source 1606 illuminates a spot S on a remote object. The camera $C_1$ of observes and records an image caused by the reflection of this spot S' in its sensor as a group of pixels $P_{1ij}$-$P_{1kl}$. The camera $C_2$ also observes the same spot S as reflected onto its sensor as spot S" in the form of a second group of pixels $P_{2mn}$-$P_{2op}$. This spot will be in a different position.

A processor finds correspondences between the two spots. There is, for example, a feature F on the object illuminated by the spot resulting in its image being projected as F' in camera $C_1$ and as F" in camera $C_2$. The matching of F' with F" is the result of a search of all points $P_{1ij}$-$P_{1kl}$ in $C_1$ and comparing them against all points $P_{2mn}$-$P_{2op}$ in $C_2$.

So, for example, if the spot images S' as 1,000 pixels and it images in an approximately equal number of pixels as S" a feature matching procedure may examine at most 1,000,000 possible pairs of features F'-F"s where F' belongs to $Ph_{1ij}$-$P_{1kl}$ in $C_1$, and F" belongs to $P_{2mn}$-$P_{2op}$ in $C_2$.

Figure 17:
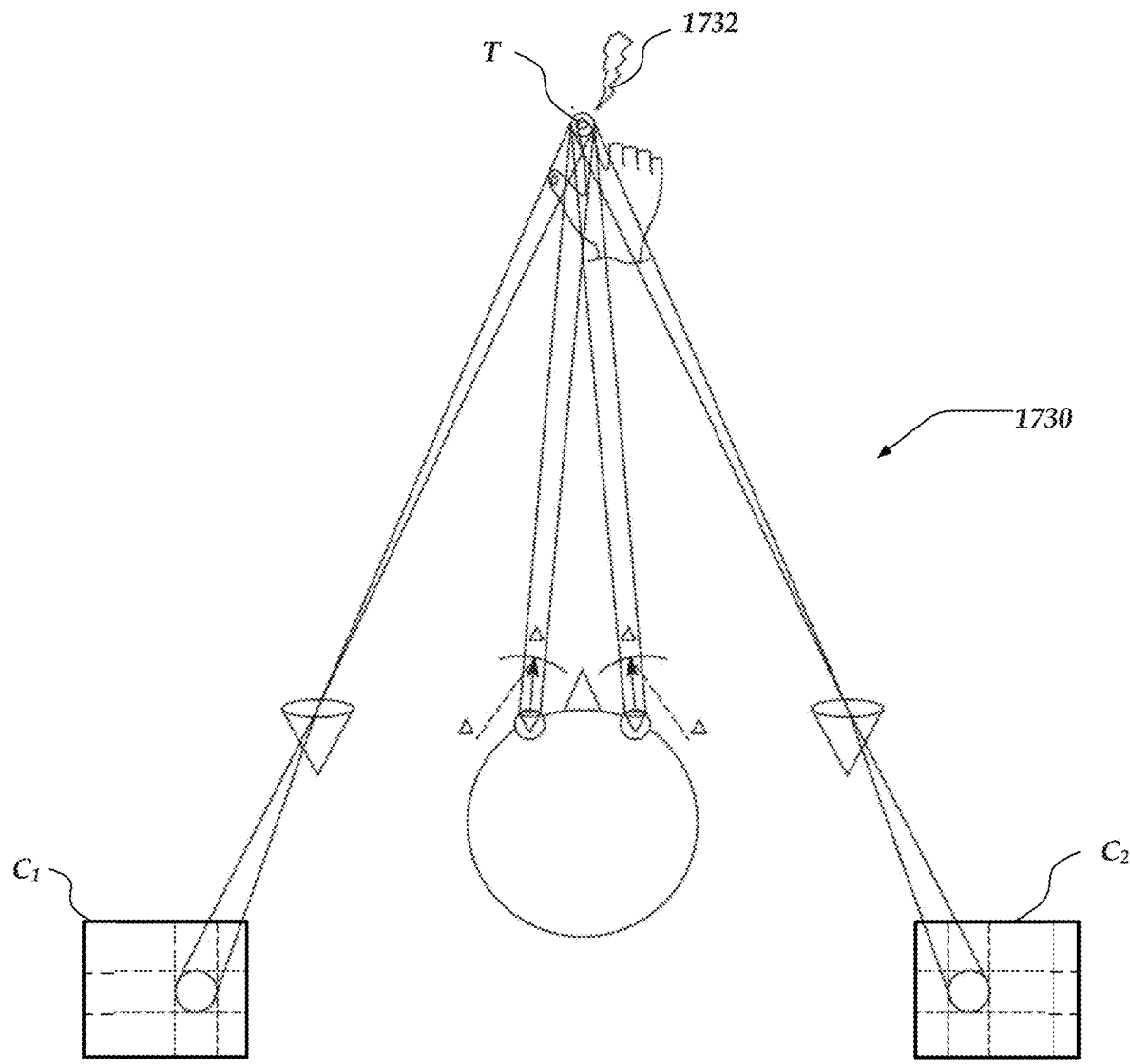
FIG. 17 illustrates a head mounted display which tracks the eye gaze of the user.

In at least some embodiments, FIG. 17 illustrates an augmented reality (AR) system that includes a head mounted display (HMD) 1730 which tracks the eye gaze of the user. The user gazes upon a close object, for example, her fingertip T. The HMD system tracks the gaze of her eyes precisely, so as to be able to position ("anchor") augmented reality enhancements affixed to her finger, for example, a small virtual flame 1732 flickering from her fingertip T. Two cameras, $C_1$ and $C_2$ are positioned on the left and right side of her wearable HMD, for example, on the hinges of her AR glasses observing the field of view in front of her head. The observable field of view scanned by the cameras may be quite wide, for example, 120 degrees wide in total and 90 degrees vertically with a substantial stereo perspective overlap between the cameras, for example, approximately 70 degrees in the far field (it would be less in the near field closer to the user's head). Each of the cameras might scan 100 degrees, with approximately 10 degree monoscopic perspectives both on the right and the left side of the 120-degree FoV. In the stereo overlapping FoV area, any place the user might foveate is could have a resolution of at least 20/20 human vision, which can be, for example, 60 columns (pixels) per degree. At that resolution each of the cameras would have 32.4 Mpixels (90 degrees by 100 degrees, or 90,000 "square degrees at 3600 pixels per square degree).

It is advantageous to use a short wavelength to scan the world so that the size of the camera sensors can be kept relatively small. This is why using blue laser light, for example, a wavelength of 445 nm, to scan the reality to be augmented is desirable. It enables a pixel size as small as 500 nm, and this keeps the sensor economical—as the active pixel array of the 32.4-megapixel sensors 6000 columns and 5400 rows can have a size of 3 mm by 2.7 mm. This reduced size allows the cameras to be fitted on the HMD, yet still have sufficient spatial resolution when using short wave length (blue) illumination.

Another challenge is the inherent energy requirements and latency issues associated with scanning across such a large array. The solution is to follow the user's gaze, and "co-foveate", that is, to focus and restrict the sensor activation and read-out to a small subsection that corresponds to the user's gaze. When the user is staring at her finger tip, like her eyes, the HMD cameras need to critically resolve only "what she is staring at", i.e. only her fingertip. Any other sections in her field of view are much less critical to perceive, or to anchor. However in the area of her foveation, 3D spatial perception is of importance.

HMDs can track the user's gaze to fractions of a degree. Using this signal the system can select and activate, for example, only a 90,000 pixel subsection of the 32.4 M Pixel sensor. This is a very small fraction of the array, less than 0.3%. Foveation of the cameras following the user's gaze greatly reduces the computational requirements, the energy, and the latency of the HMD perceptual system.

Tracking the user's gaze can equally drive the auto focus of the HMD cameras. Typically, the accommodation is driven by the vergence detected as the "towing in" of the user's eyes. Looking at the fingertip, the user's left and right eye gazes converge and her lenses accommodate as part of her foveation on her fingertip. Detecting that close up vergence, and the exact location, her AR device's cameras follow her foveation on her finger. Because the position of these HDM cameras substantially differs from the position of her eyes the vergence and accommodation of the cameras is different, but can be calibrated as a programmable geometric algorithm.

Optionally, the HMD might also be provided with scanning illumination beams that track the gaze and selectively illuminate the fingertip, "catching" her fingertip in a spot light, illuminating it selectively with brief flashes of laser light.

Optionally, strobed flashes of bright blue (445 nm) laser light trigger can select subsections in the sensors as described above.

Further, optionally, the light beams illuminating her finger—the object of attention she and her device are foveating on—mark a fiducial mark on her finger, adding, for example, a sharp instant contrast that enable the cameras to align their gaze at pixel resolution and thus greatly facilitate stereo matching (feature pairing) of the two views of the fingertip.

In at least some embodiments, the illumination beam selects a small subset of the field of view. Further, in the illumination is a structured fiducial pattern, for example, a cross-hair pattern, that serves the function of allowing cameras with different, potentially partial, perspectives of the illuminated manifold areas to quickly find at least one matching point pair (N-tuple, if there are N cameras observing the illuminated manifold area) which then serves as a "seed" to finding other correspondences in areas adjacent to that fiducial reference.

Figure 18:
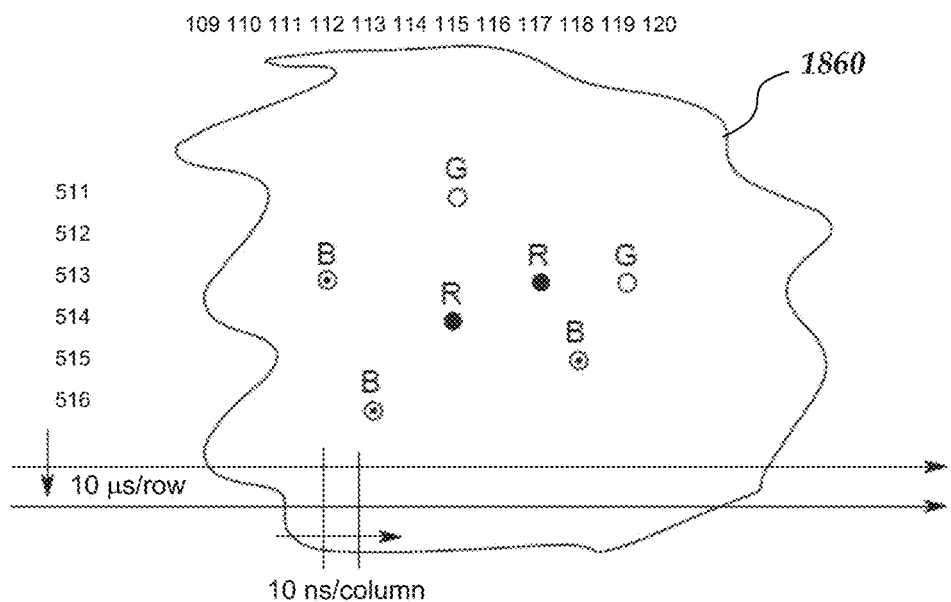
FIG. 18 illustrates an arrangement of colored fiducial markers in a road.

FIG. 18 illustrates one example of retro-reflective fiducial markers that are embedded in a road surface. FIG. 18 is a camera perspective of the surface. Its shows only a small subsection 1860 of approximately 72 positions in the camera sensor and corresponding road surface (e.g., twelve columns, #109 to #120, and six rows, #511 to #516.) The first green fiducial marker is detected in row #511, positioned at column #115 and is illuminated at a time "10230 nanoseconds" (the latter may just be an arbitrary clock timer incrementing every 10 nanoseconds). The next fiducial marker is detected two rows down (later) and is blue at row #513 and column #112.

It will be understood that perspectives and the scanning sequence may vary but the absolute geometric distance is invariant, and can be recorded and recognized. For example, the distance from $G_1$ to $B_1$ on the surface is approximately 36 mm if the unit scale in the sensor is 10 mm per pixel as it is observed two rows down (20 mm longitudinal direction) and three columns sooner in the scan (30 mm in the lateral direction) and then the absolute distance is approximately 36 mm.

Distances and colors of adjacent RR fiducial markers thus create a unique spatial color mesh which can be recognized and which uniquely defines a certain position on the road as well as a perspective of an observing camera. Keeping track of the precise temporal sequence enables the motion and kinetics of the observer to be very accurately determined (for example, at least centimeter spatial precision at 10 nanosecond time precision). The spatial distribution need not be very dense and 3 colors would suffice, but more or fewer color may be used. With exact spatial coding, a monochrome system using clear RR fiducial markers may also work sufficiently well.

Figure 19:
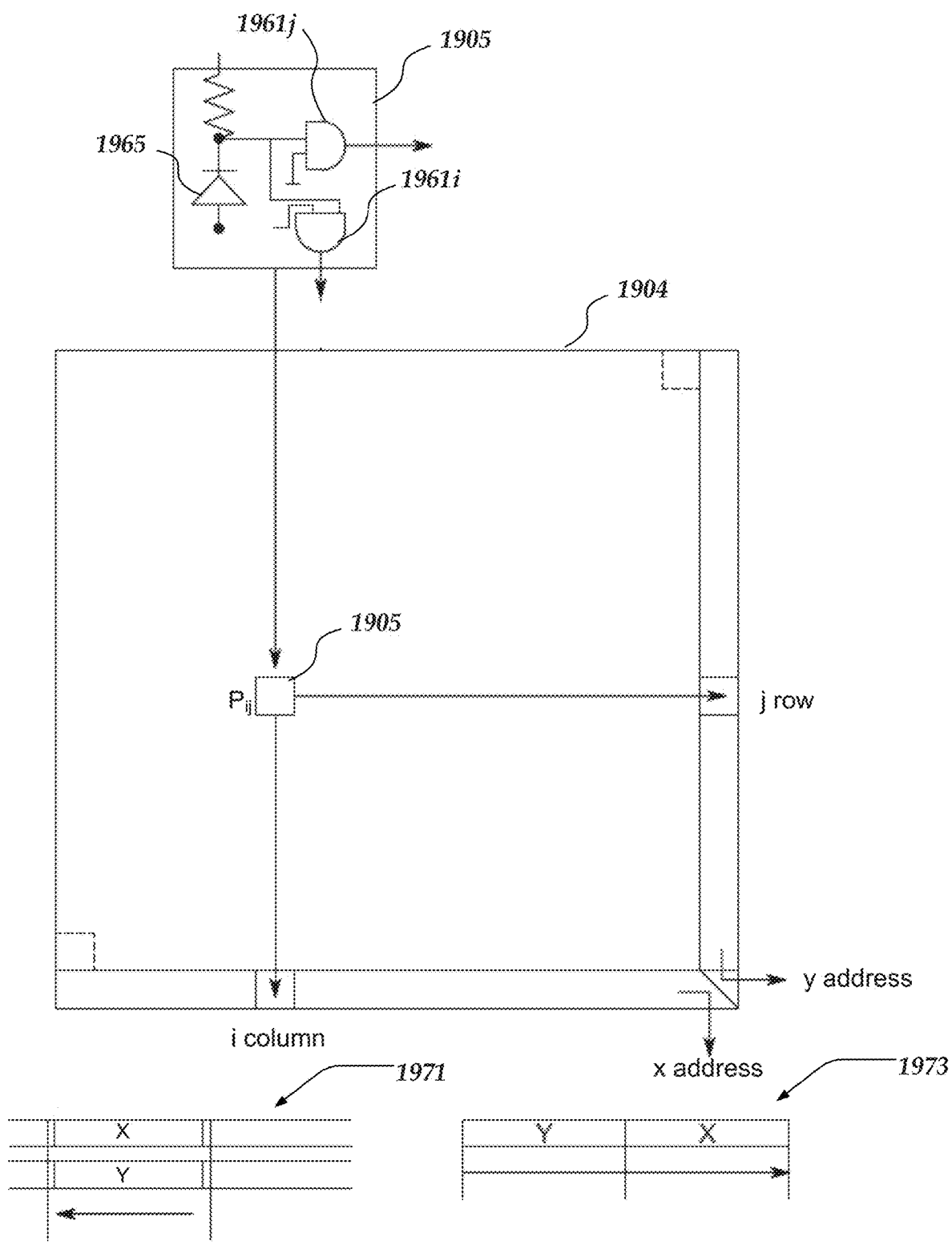
FIG. 19 illustrates an embodiment of a camera or sensor utilizing "twitchy pixels"

FIG. 19 illustrates an optical receiver or camera 1904, with an array of pixels 1905 (one of which is expanded) acting as real-time location detector. Pixels "twitch" when the photodiode 1965 receive light reflecting from a spot projected by a laser on a remote surface. Electronic circuits (transistors, digital or analog logic, for example threshold and amplify logic 1961i, 1961j) for individual pixels in the array are configured to send the pixels location, for example, the pixel's row and column address, to a processing system as soon as the photodiode in the pixel receives (i.e., detects) a photon flux intensity exceeding a minimal threshold value.

In at least some embodiments, the sensor, circuit and optics can be tuned to be selectively, optimally or exclusively sensitive to a single wavelength, for example, 405 nm (as very short wavelength, near UV wavelength which to the human eye in sub 10 mW intensities can be scanned both safely and nearly invisibly.) A twitchy pixel sensor may be sensitive to broader bands of light, or may be tuned to other visible or invisible wavelengths such as NIR (for example, 850 nm or 940 nm) or MIR (for example, 1550 nm)

A simple sensor may have, for example, 1000 rows of 1000 pixels, where each pixel has a small standard CMOS photodiode coupled to high-gain amplifiers, with sufficient drive to pulse both a row and a column detection sensing line. The "twitchy pixel" circuits acts as binary (on/off) spot detectors which are by default off. At the periphery of the pixel array area, 1000 row and 1000 column lines are connected to a simple address encoder. When an individual row or column is triggered, the encoders translate (encode) the identity of such triggered (pulse activated) lines in real time by sending a corresponding digital address. Each of 1000 columns and of 1000 rows can be encoded in a 10-bit address.

These row and column address encoder circuits may have two separate dedicated serial outputs 1971. They nearly simultaneously send out a 10-bit column address (indicating the x location of the pixel in the array) and a corresponding 10-bit row address (indicating the y location of the pixel in the array). In this configuration, the pixel address can be sent to and processed by a processor, as soon as the pixel detects a photon flux exceeding the set threshold. Thus, the scanned trajectory of the laser results in a steady stream of pixel locations being reported, each representing a sequentially observed—distinct-laser spot location. In at least some embodiments, detected fiducial marker locations are reported in real time, each sequentially, to a processing system with minimal latency within a few tens of nanoseconds.

Optionally, both X and Y locations are sent sequentially in a 20-bit string on the same serial line 1973. See, for example, U.S. Pat. No. 9,581,883 and U.S. patent application Ser. No. 15/853,783, both of which are incorporated herein by reference in their entireties.

Optionally, the photodiode detector may be an avalanche photodiode (APD) or silicon photomultiplier (SiPM) array provided with analogous real-time, low-latency column and or row address encoding circuits that provide the location of each successive avalanching pixel event.

Figure 20A:
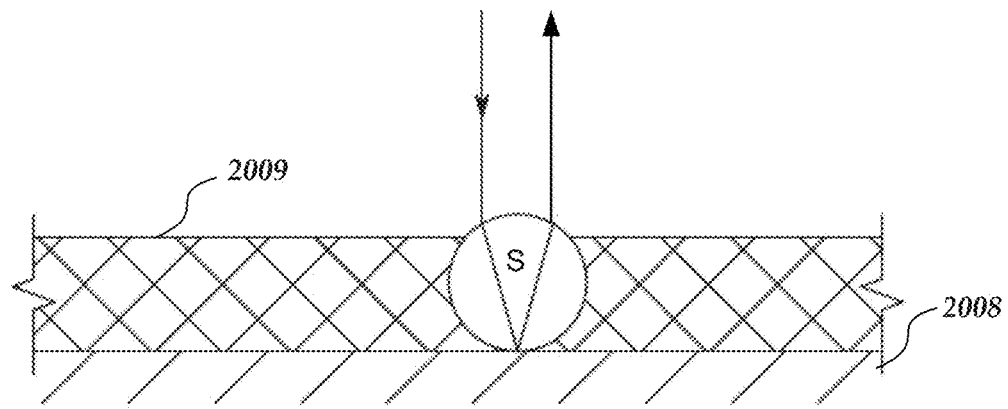
FIG. 20A-C illustrate fiducial markers in a road surface.

FIG. 20A illustrates a retro-reflective transparent sphere S (i.e., a fiducial marker as describe above) that can be added to an existing road surface (ERS) 2008 by mixing the spheres with an adhesive coating (AC) layer 2009 which is painted or sprayed onto the existing road surface ERS, where it dries and hardens. The retro-reflective spheres end up randomly or irregularly distributed (or distributed in a regular arrangement, if desired) and fixed to the road. This creates a unique pattern that then can be used as a highly accurate positioning system by vehicles with the systems described above.

Figure 20B:
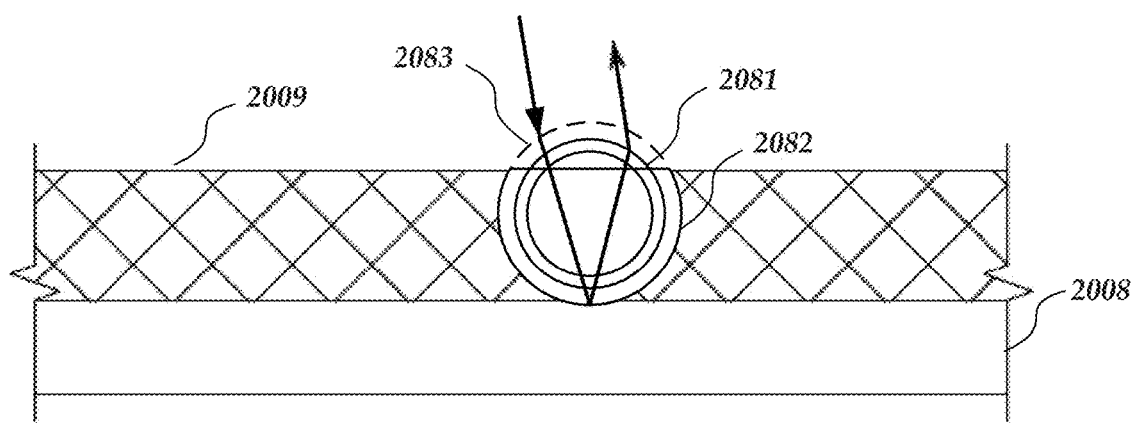

Turning to FIG. 20B, before mixing with the adhesive coating, the spheres S may be coated with a hard-coated anti-reflective coating 2081 which serves as a narrow bandpass filter. Light from the strobe or scan lasers will pass selectively through these narrowband pass filters up to 4 times: first when entering, then twice when retro-reflecting internally, and finally when departing. In at least some embodiments, outer reflective coatings 2082 may be applied to increase the retroflectivity for reflections. These coatings may be designed to harden in places where the adhesive coating covers them (for example, is in contact with them) serving to specularly reflect light within the sphere. But in the top driving surface the sphere's optical surface should be exposed, and a portion 2083 of the reflective coating 2082 might be designed to dissolve or vanish by, for example, a chemical wash, UV exposure, or chemical components added to this layer effect the selective removal of the exposed portion 2083 of the reflective coating 2082.

Figure 20C:
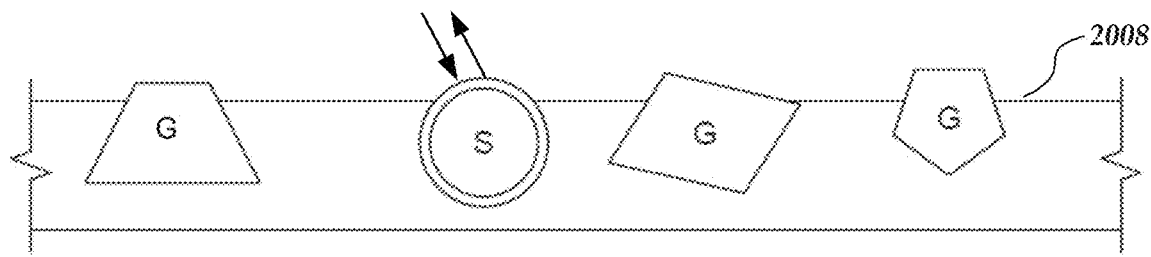

FIG. 20C illustrate shows that hard quartz grit (G) particles, which are typically added to top layers coating drivable surfaces 2008, may be mixed with a sparse amount of spherical retro-reflective fiducial markers (S).

Wear and tear of the road can expose the hard glass colored fiducial markers, such as hard-coated scratch-resistant spherically shaped small glass beads. The tar adhesive coating provides contrast with the fiducial markers. Its main function is to lock the fiducial markers permanently in place. It could be composed of specially formulated epoxy.

Note that as the surface wears out some markers inevitably will be lost, and a new topical coating patch with fresh fiducial markers can be applied using standard road maintenance techniques and procedures. This process of maintenance can be automated, enabling a robotic repair system.

Figure 21A:
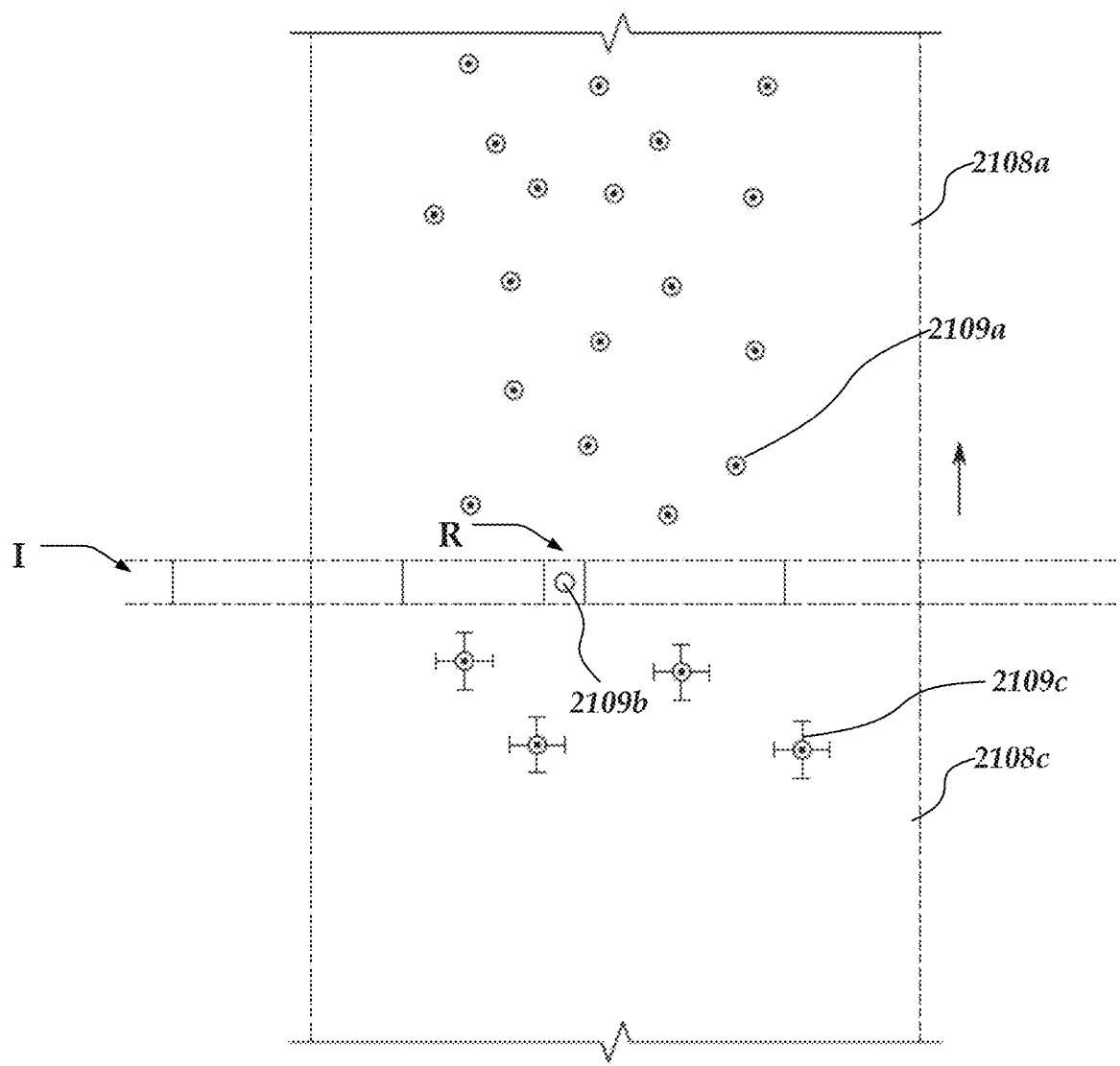
FIG. 21A illustrates a top view of a section of road surface, in which at random places retro-reflective fiducial markers have been placed.

FIG. 21A illustrates a top view of a section of road surface, in which at random places retro-reflective fiducial markers have been placed. Fiducial markers 2109a mark a section 2108a immediately ahead of the vehicle. A downward looking linear pixel array camera R sequentially observes the road surface directly below the camera while it is illuminated by a bright strobe illumination scanline I that substantially overlaps with the linear aperture of the camera R. In at least some embodiments, the pixels in this array may be configured for asynchronous detection, as described in U.S. Pat. No. 8,696,141, incorporated herein by reference in its entirety, so that the observational time might be accurate to a microsecond. The camera may be, for example, a linear SiPM array (silicon photomultiplier array). As result in this arrangement the longitudinal travel velocity and position can be marked with precision.

Figure 21B:
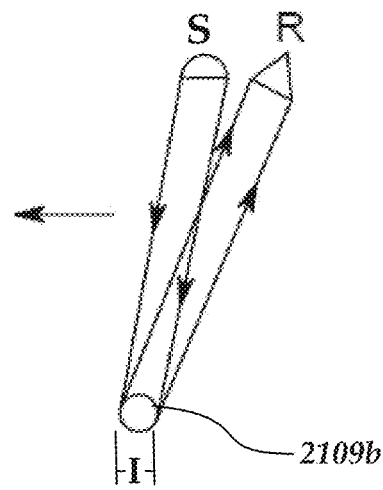
FIG. 21B illustrates a side view of the illumination of a fiducial marker and the reflection of light back to a camera.

The retro-reflection of fiducial marker 2109b lights up pixel i in the array. The system notes the pixel location at time t, and because it knows its current trajectory and velocity from prior observations, it can confirm that this fiducial marker is at the expected location. Thus, the observation serves to update the vehicle's exact current location on the road. The most recent observation joins a set of four or more prior such fiducial markers 2109c observed and confirmed during the recent millisecond in road section 2108c. By known photogrammetry methods the vehicle's six DoF position and motion vectors can be updated. The system can provide 100's of such navigational and mapping updates per second. FIG. 21B is a side view of the light source S producing illumination line I and the camera R. A fiducial marker 210b is reflecting a portion of the illumination from source S back towards the camera R.

Figure 22:
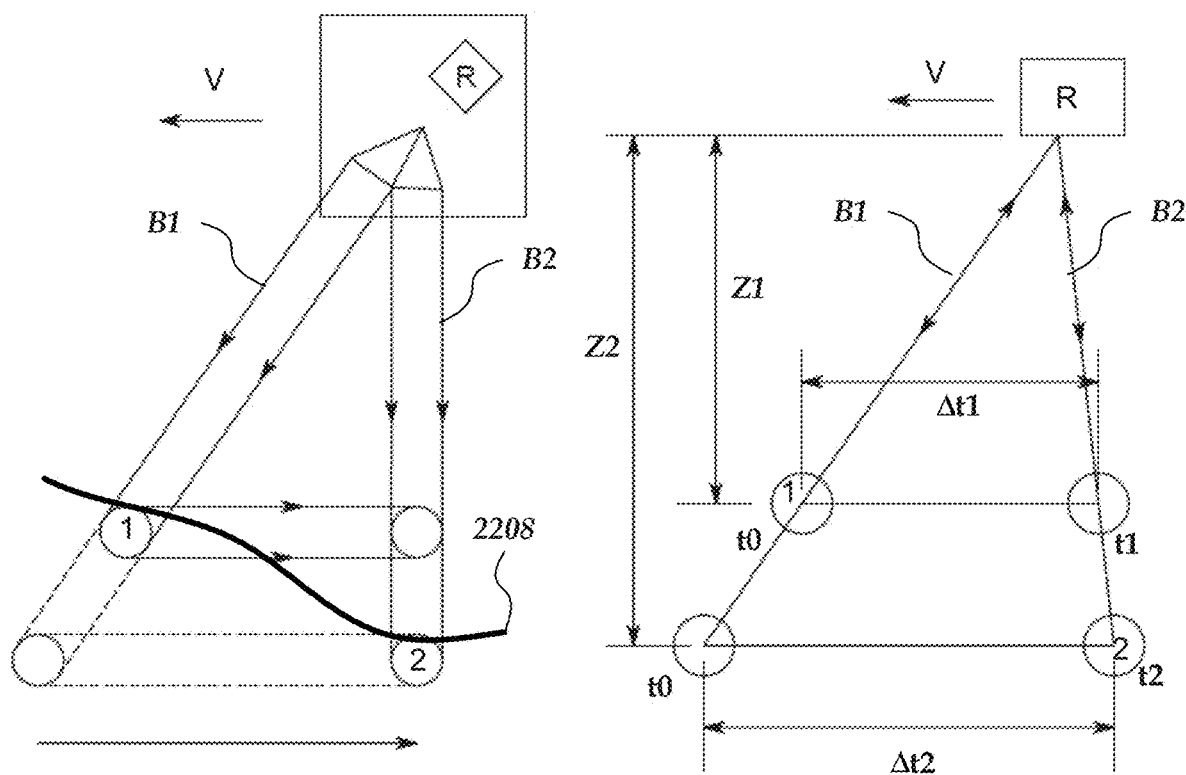
FIG. 22 illustrates an embodiment where two beams (B1 and B2) illuminate the road surface below and cause successive retro reflections from two lines.

FIG. 22 illustrates an embodiment where two beams (B1 and B2) illuminate the road surface below and cause successive retro reflections from two lines. These are observed by the same fast asynchronous linear receiver (camera) R. In this arrangement the distance of the receiver to the road surface 2208 (for example, the road clearance below the vehicle's front bumper,) can be tracked in real time. As shown in the drawing each fiducial marker will be twice illuminated. Fiducial markers 1 and 2 are at distances z1 and z2 respectively from receiver R. Time t0 is the time at which each of the fiducial markers is illuminated by B1 (and is not necessarily the same absolute time for each fiducial marker). At a later time t1, beam B2 illuminates fiducial marker 1, and causes a second pulse at the same pixel location in the linear array. At yet a later time t2 the second fiducial marker passes through beam 2, and its interval between successive pulses is correspondingly bigger. For any given vehicular velocity V, when Z2>Z1, then Δt1 (which equals t1–t0 for fiducial marker 1) is smaller than Δt2 (which equals t2–t0 for fiducial marker 2). Accordingly, these time measurements can be used to estimate the height of fiducial marker 2 relative to fiducial marker 1.

The asynchronous receiver "twitchy pixels" (e.g. APD or SiPM pixels) enables these relative time intervals to be observed with microseconds precision, and as a result accurate road clearance distances (front of vehicle road clearance height) can be determined to, for example, the mm within a millisecond at 50 meters per second (112 mph).

The time interval observed between successive flashes is shorter as the receiver comes closer to the pavement. This may help to reduce the road clearance for optimal aerodynamics at high speed, for example, to enable improved "road hugging.", using a splitter or skirts to prevent air from being trapped below the vehicle. "Road Hugging" improves traction and saves energy at greater highway speeds. In at least some embodiments, this arrangement can also be used to map the exact height with respect to the pavement or other fiducial markers. For example, it would allow a mapping robot to sweep the road and determine its exact shape, curvature, and cant in 3D spatial coordinates.

What is claimed as new and desired to be protected by Letters Patent of the United States is:

1. A method for navigating a vehicle along a surface, the method comprising:
    employing a scanner to scan light on the surface, wherein the scanned light forms a shape on the surface located in front of the vehicle;
    employing a receiver to receive light reflected by one or more markers on the surface in front of the vehicle to determine a spatial arrangement of the one or more markers;
    employing a reflection of the shape to determine visual contrast information that is added to a map that includes the surface located in front of the vehicle; and
    comparing the spatial arrangement of the markers to the modified map to determine a current location of the vehicle.

2. The method of claim 1, wherein employing the scanner comprises employing the scanner to sequentially scan the scanned light along a line or region of the surface.

3. The method of claim 1, wherein the scanner is configured to simultaneously illuminate a line across the surface with the scanned light, wherein employing the scanner comprises employing the scanner to sequentially scan a series of lines on the surface.

4. The method of claim 1, wherein each of the markers is one of a plurality of different colors, wherein employing the scanned light reflected by the one or more markers comprises determining a different color for each of the one or more markers.

5. The method of claim 1, further comprising:
    employing the scanned light reflected from an object on the surface in front of the vehicle to determine a position of, or to identify, the object; and
    determining a path for the vehicle to maneuver to avoid the object on the surface in front of the vehicle.

6. The method of claim 1, further comprising:
    employing the scanned light reflected from the surface in front of the vehicle to determine a physical condition of the surface;
    adjusting operation of the vehicle in view of the determined physical condition of the surface; and
    adjusting a suspension system of the vehicle in view of the determined physical condition of the surface.

7. The method of claim 1, further comprising sequentially observing subsets of pixels of the receiver in coordination with the scanning of the scanned light.

8. A system to navigate a vehicle along a surface, comprising:
- a scanner configured to scan light over a field of view;
- a receiver that comprises a plurality of pixels configured to detect light;
- one or more memory devices that store instructions; and
- one or more processor devices that execute the stored instructions to perform actions, including:
  - employing the scanner to scan light on the surface, wherein the scanned light forms a shape on the surface located in front of the vehicle;
  - employing a receiver to receive light reflected by one or more markers on the surface in front of the vehicle to determine a spatial arrangement of the one or more markers;
  - employing a reflection of the shape to determine visual contrast information that is added to a map that includes the surface located in front of the vehicle; and
  - comparing the spatial arrangement of the markers to the modified map to determine a current location of the vehicle.

9. The system of claim 8, wherein employing the scanner comprises employing the scanner to sequentially scan the scanned light along a line or region of the surface.

10. The system of claim 8, wherein the scanner is configured to simultaneously illuminate a line across the surface with the scanned light, wherein employing the scanner comprises employing the scanner to sequentially scan a series of lines on the surface.

11. The system of claim 8, wherein each of the markers is one of a plurality of different colors, wherein employing the scanned light reflected by the one or more markers comprises determining a different color for each of the one or more markers.

12. The system of claim 8, further comprising:
- employing the scanned light reflected from an object on the surface in front of the vehicle to determine a position of, or to identify, the object; and
- determining a path for the vehicle to maneuver to avoid the object on the surface in front of the vehicle.

13. The system of claim 8, further comprising:
- employing the scanned light reflected from the surface in front of the vehicle to determine a physical condition of the surface;
- adjusting operation of the vehicle in view of the determined physical condition of the surface; and
- adjusting a suspension system of the vehicle in view of the determined physical condition of the surface.

14. The system of claim 8, further comprising sequentially observing subsets of pixels of the receiver in coordination with the scanning of the scanned light beam.

15. A non-transitory processor readable storage media that includes instructions for navigating a vehicle along a surface, wherein execution of the instructions by one or more processor devices cause the one or more processor devices to perform actions, comprising:
- employing a scanner to scan light on the surface, wherein the scanned light forms a shape on the surface located in front of the vehicle;
- employing a receiver to receive light reflected by one or more markers on the surface in front of the vehicle to determine a spatial arrangement of the one or more markers;
- employing a reflection of the shape to determine visual contrast information that is added to a map that includes the surface located in front of the vehicle; and
- comparing the spatial arrangement of the markers to the modified map to determine a current location of the vehicle.

16. The non-transitory processor readable storage media of claim 15, wherein employing the scanner comprises employing the scanner to sequentially scan the scanned light along a line or region of the surface.

17. The non-transitory processor readable storage media of claim 15, wherein the scanner is configured to simultaneously illuminate a line across the surface with the scanned light, wherein employing the scanner comprises employing the scanner to sequentially scan a series of lines on the surface.

18. The non-transitory processor readable storage media of claim 15, wherein each of the markers is one of a plurality of different colors, wherein employing the scanned light reflected by the one or more markers comprises determining a different color for each of the one or more markers.

19. The non-transitory processor readable storage media of claim 15, further comprising:
- employing the scanned light reflected from an object on the surface in front of the vehicle to determine a position of, or to identify, the object; and
- determining a path for the vehicle to maneuver to avoid the object on the surface in front of the vehicle.

20. The non-transitory processor readable storage media of claim 15, further comprising:
- employing the scanned light reflected from the surface in front of the vehicle to determine a physical condition of the surface;
- adjusting operation of the vehicle in view of the determined physical condition of the surface; and
- adjusting a suspension system of the vehicle in view of the determined physical condition of the surface.

* * * * *